(12) United States Patent
Deninger et al.

(10) Patent No.: US 8,010,689 B2
(45) Date of Patent: Aug. 30, 2011

(54) LOCATIONAL TAGGING IN A CAPTURE SYSTEM

(75) Inventors: William Deninger, Mountain View, CA (US); Ratinder Paul Singh Ahuja, Saratoga, CA (US); Erik de la Iglesia, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 708 days.

(21) Appl. No.: 11/439,484

(22) Filed: May 22, 2006

(65) Prior Publication Data

US 2007/0271372 A1 Nov. 22, 2007

(51) Int. Cl.
*G06F 15/16* (2006.01)
(52) U.S. Cl. ........... 709/230; 726/13; 370/389; 370/392
(58) Field of Classification Search .................. 726/13
See application file for complete search history.

(56) References Cited

U.S. PATENT DOCUMENTS

| | | | |
|---|---|---|---|
| 4,286,255 A | 8/1981 | Siy | |
| 4,710,957 A | 12/1987 | Bocci et al. | |
| 5,249,289 A | 9/1993 | Thamm et al. | |
| 5,465,299 A | 11/1995 | Matsumoto et al. | |
| 5,479,654 A | 12/1995 | Squibb | |
| 5,497,489 A | 3/1996 | Menne | |
| 5,542,090 A | 7/1996 | Henderson et al. | |
| 5,557,747 A | 9/1996 | Rogers et al. | |
| 5,623,652 A | 4/1997 | Vora et al. | |
| 5,768,578 A | 6/1998 | Kirk | |
| 5,781,629 A | 7/1998 | Haber et al. | |
| 5,794,052 A * | 8/1998 | Harding | 717/178 |
| 5,813,009 A | 9/1998 | Johnson et al. | |
| 5,943,670 A | 8/1999 | Prager | |
| 5,995,111 A | 11/1999 | Morioka et al. | |
| 6,026,411 A | 2/2000 | Delp | |
| 6,078,953 A * | 6/2000 | Vaid et al. | 709/223 |
| 6,094,531 A * | 7/2000 | Allison et al. | 717/176 |
| 6,108,697 A * | 8/2000 | Raymond et al. | 709/218 |
| 6,161,102 A | 12/2000 | Yanagilhara et al. | |
| 6,175,867 B1 * | 1/2001 | Taghadoss | 709/223 |
| 6,192,472 B1 | 2/2001 | Garay et al. | |
| 6,243,091 B1 | 6/2001 | Berstis | |
| 6,243,720 B1 | 6/2001 | Munter et al. | |
| 6,278,992 B1 | 8/2001 | Curtis et al. | |
| 6,292,810 B1 | 9/2001 | Richards | |
| 6,336,186 B1 | 1/2002 | Dyksterhouse et al. | |
| 6,356,885 B2 | 3/2002 | Ross et al. | |
| 6,389,419 B1 | 5/2002 | Wong et al. | |
| 6,408,294 B1 | 6/2002 | Getchius et al. | |

(Continued)

OTHER PUBLICATIONS

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, printed Mar. 12, 2009.

(Continued)

*Primary Examiner* — Ian N Moore
*Assistant Examiner* — Bobae K Cheney
(74) *Attorney, Agent, or Firm* — Patent Capital Group

(57) ABSTRACT

A system and method for locational tagging in a capture system are described. Metadata associated with a captured object includes: information about a location in storage of an object and that objects association to a particular user; and/or tiered location information.

15 Claims, 13 Drawing Sheets

U.S. PATENT DOCUMENTS

| | | |
|---|---|---|
| 6,408,301 B1 | 6/2002 | Patton et al. |
| 6,457,017 B2 | 9/2002 | Watkins et al. |
| 6,493,761 B1 | 12/2002 | Baker et al. |
| 6,499,105 B1 | 12/2002 | Yoshiura et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,571,275 B1 | 5/2003 | Dong et al. |
| 6,598,033 B2 | 7/2003 | Ross et al. |
| 6,662,176 B2 * | 12/2003 | Brunet et al. ............... 707/2 |
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,937,257 B1 | 8/2005 | Dunlavey |
| 6,950,864 B1 | 9/2005 | Tsuchiya |
| 6,978,297 B1 | 12/2005 | Piersol |
| 7,020,654 B1 | 3/2006 | Najmi |
| 7,020,661 B1 | 3/2006 | Cruanes et al. |
| 7,062,572 B1 * | 6/2006 | Hampton .................. 709/245 |
| 7,072,967 B1 | 7/2006 | Saulpaugh et al. |
| 7,082,443 B1 * | 7/2006 | Ashby ...................... 707/201 |
| 7,093,288 B1 | 8/2006 | Hydrie et al. |
| 7,130,587 B2 | 10/2006 | Hikokubo et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,293,067 B1 * | 11/2007 | Maki et al. ............... 709/217 |
| 7,293,238 B1 | 11/2007 | Brook et al. |
| 7,296,070 B2 | 11/2007 | Sweeney et al. |
| 7,296,088 B1 * | 11/2007 | Padmanabhan et al. ...... 709/238 |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 * | 9/2008 | Feroz et al. ............... 370/232 |
| 7,434,058 B2 | 10/2008 | Ahuja et al. |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,596,571 B2 | 9/2009 | Sifry |
| 7,664,083 B1 | 2/2010 | Cermak et al. |
| 7,760,730 B2 | 7/2010 | Goldschmidt et al. |
| 7,760,769 B1 | 7/2010 | Lovett et al. |
| 2001/0032310 A1 | 10/2001 | Corella |
| 2001/0037324 A1 | 11/2001 | Agrawal et al. |
| 2001/0046230 A1 * | 11/2001 | Rojas ..................... 370/389 |
| 2002/0032677 A1 | 3/2002 | Morgenthaler et al. |
| 2002/0052896 A1 | 5/2002 | Streit et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0129140 A1 | 9/2002 | Peled et al. |
| 2002/0159447 A1 * | 10/2002 | Carey et al. ............. 370/389 |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0065571 A1 * | 4/2003 | Dutta ..................... 705/26 |
| 2003/0084300 A1 | 5/2003 | Koike |
| 2003/0084318 A1 * | 5/2003 | Schertz .................. 713/200 |
| 2003/0084326 A1 | 5/2003 | Tarquini |
| 2003/0099243 A1 * | 5/2003 | Oh et al. ............... 370/395.21 |
| 2003/0105739 A1 | 6/2003 | Essafi et al. |
| 2003/0131116 A1 | 7/2003 | Jain et al. |
| 2003/0135612 A1 | 7/2003 | Huntington |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0054779 A1 | 3/2004 | Takeshima et al. |
| 2004/0059736 A1 | 3/2004 | Willse et al. |
| 2004/0071164 A1 * | 4/2004 | Baum ..................... 370/469 |
| 2004/0088367 A1 * | 5/2004 | Reinke .................... 709/215 |
| 2004/0111678 A1 | 6/2004 | Hara |
| 2004/0114518 A1 * | 6/2004 | MacFaden et al. ........ 370/230.1 |
| 2004/0117414 A1 * | 6/2004 | Braun et al. ............. 707/204 |
| 2004/0120325 A1 | 6/2004 | Ayres |
| 2004/0122863 A1 | 6/2004 | Sidman |
| 2004/0181513 A1 | 9/2004 | Henderson et al. |
| 2004/0181690 A1 | 9/2004 | Rothermel et al. |
| 2004/0194141 A1 | 9/2004 | Sanders |
| 2004/0196970 A1 | 10/2004 | Cole |
| 2004/0230572 A1 | 11/2004 | Omoigui |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 * | 2/2005 | Figueira et al. ............. 709/238 |
| 2005/0033747 A1 | 2/2005 | Wittkotter |
| 2005/0033803 A1 | 2/2005 | Vleet et al. |
| 2005/0038809 A1 | 2/2005 | Abajian et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 * | 5/2005 | Riise et al. ................ 707/10 |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138242 A1 | 6/2005 | Pope et al. |
| 2005/0138279 A1 * | 6/2005 | Somasundaram ............ 711/108 |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0083180 A1 * | 4/2006 | Baba et al. ................ 370/252 |
| 2006/0150249 A1 | 7/2006 | Gassen et al. |
| 2006/0167896 A1 | 7/2006 | Kapur et al. |
| 2006/0184532 A1 * | 8/2006 | Hamada et al. ............. 707/10 |

| | | | |
|---|---|---|---|
| 2006/0242126 A1 | 10/2006 | Fitzhugh | |
| 2006/0242313 A1 | 10/2006 | Le et al. | |
| 2006/0251109 A1 | 11/2006 | Muller et al. | |
| 2006/0272024 A1 | 11/2006 | Huang et al. | |
| 2006/0288216 A1 | 12/2006 | Buhler et al. | |
| 2007/0006293 A1 | 1/2007 | Balakrishnan et al. | |
| 2007/0036156 A1 | 2/2007 | Liu et al. | |
| 2007/0050334 A1 | 3/2007 | Deninger et al. | |
| 2007/0050381 A1 | 3/2007 | Hu et al. | |
| 2007/0050467 A1 | 3/2007 | Borrett et al. | |
| 2007/0081471 A1 | 4/2007 | Talley et al. | |
| 2007/0094394 A1 | 4/2007 | Singh et al. | |
| 2007/0110089 A1 | 5/2007 | Essafi et al. | |
| 2007/0116366 A1 | 5/2007 | Deninger et al. | |
| 2007/0136599 A1 | 6/2007 | Suga | |
| 2007/0162609 A1 | 7/2007 | Pope et al. | |
| 2007/0226504 A1 | 9/2007 | de la Iglesia et al. | |
| 2007/0226510 A1 | 9/2007 | de la Iglesia et al. | |
| 2007/0248029 A1 | 10/2007 | Merkey et al. | |
| 2007/0271254 A1 | 11/2007 | de la Iglesia et al. | |
| 2007/0271371 A1 | 11/2007 | Ahuja et al. | |
| 2007/0280123 A1 | 12/2007 | Atkins et al. | |
| 2008/0028467 A1* | 1/2008 | Kommareddy et al. | 726/23 |
| 2008/0235163 A1 | 9/2008 | Balasubramanian et al. | |
| 2009/0300709 A1 | 12/2009 | Chen | |
| 2010/0185622 A1 | 7/2010 | Deninger et al. | |
| 2010/0268959 A1 | 10/2010 | Lowe et al. | |
| 2011/0004599 A1 | 1/2011 | Deninger et al. | |

OTHER PUBLICATIONS

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

Preneel, Bart, "Cryptographic Hash Functions", Proceedings of the 3$^{rd}$ Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

Microsoft Outlook, Out look, copyright 1995-2000, 2 pages.

"Computer program product for analyzing network traffic", Ethereal. Computer program product for analyzing network traffic, pp. 17-26 http://web.archive.org/web/20030315045117/www.ethereal.com/distribution/docs/user-guide.

U.S. Appl. No. 12/690,153, filed Jan. 20, 2010, entitled "Query Generation for a Capture System," Inventor(s) Erik de la Iglesia, et al.

U.S. Appl. No. 12/873,061, filed Aug. 31, 2010, entitled "Document Registration," Inventor(s) Ratinder Paul Singh Ahuja, et al.

U.S. Appl. No. 12/939,340, filed Nov. 3, 2010, entitled "System and Method for Protecting Specified Data Combinations," Inventor(s) Ratinder Paul Singh Ahuja, et al.

U.S. Appl. No. 12/967,013, filed Dec. 13, 2010, entitled "Tag Data Structure for Maintaining Relational Data Over Captured Objects," Inventor(s) Erik de la Iglesia, et al.

* cited by examiner

| COMPUTER NAME | MAC | IP |
|---|---|---|
| ERIK PC | AA-BB-CC-DD-EE-F0 | 192.168.0.3 |
| ERIK LAPTOP | AA-BB-CC-DD-EE-F1 | 192.168.0.4 |
|  |  |  |
|  |  |  |

1301

| COMPUTER NAME | MAC | IP |
|---|---|---|
| ERIK PC | AA-BB-CC-DD-EE-F0 | 192.168.0.6 |
| ERIK LAPTOP | AA-BB-CC-DD-EE-F3 | 192.168.0.4 |
| NEWBIE LAPTOP | AA-BB-CC-DD-EE-F1 | 192.168.0.5 |
|  |  |  |

1303

LOCATIONAL TAGGING IN A CAPTURE SYSTEM

FIELD OF THE INVENTION

The present invention relates to computer networks, and in particular, to identifying associations between objects and users in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices.

FIG. 1 illustrates a simple prior art configuration of a local area network (LAN) 100 connected to the Internet 102. Connected to the LAN 100 are various components, such as servers 104, clients 106, and switch 108. Numerous other networking components and computing devices are connectable to the LAN 100. The LAN 100 may be implemented using various wireline or wireless technologies, such as Ethernet and the 802.11 the IEEE family of wireless communication standards. LAN 100 could be connected to other LANs.

In this prior configuration, the LAN 100 is connected to the Internet 102 via a router 110. This router 110 may be used to implement a firewall. Firewalls are widely used to try to provide users of the LAN 100 with secure access to the Internet 102 as well as to provide separation of a public Web server (for example, one of the servers 104) from an internal network (for example, LAN 100). Data leaving the LAN 100 to the Internet 102 passes through the router 110. The router 110 simply forwards packets as is from the LAN 100 to the Internet 102.

However, once an intruder has gained access to sensitive content inside a LAN such as LAN 100, there presently is no network device that can prevent the electronic transmission of the content from the network to outside the network. Similarly, there is no network device that can analyse the data leaving the network to monitor for policy violations, and make it possible to track down information leeks.

Networked computers (such as computers connected on a LAN or through the Internet) utilize addressing to communicate. A packet of data may be routed to a specific computer that is identified by a particular Internet Protocol (IP) addresses. For example, an internet browser uses the IP address of 64.236.16.20 has the location to send and receive requests from CNN.com. (The Domain Name System (using a Domain Name Server or DNS) is generally used to translate a URL such as CNN.com into an IP address.)

Media Access Control (MAC) addresses are unique identifiers for individual pieces of networking equipment. For example, each Ethernet and 802.11 wireless card has a unique MAC address. The combination of IP and MAC addresses provide a mechanism to determine which computer and/or user has performed some sort of activity on the Internet or Intranet.

The current IP standard is IP version 4 (or IPv4). An IP address in IPv4 is a four-byte (32-bit) number combination in the format of AAA.BBB.CCC.DDD. For example, 64.236.16.20 is the IPv4 address for CNN.com. IP addresses are public, private, or multicast. Public IP addresses are available to the outside world for direct access. For example, the IP address given above for CNN.com is a public address. Private IP addresses are reserved for internal/private networks. For example, IP addresses assigned by a router to individual computers on a LAN are private, whereas the IP address of the router itself is generally public. Exemplary private IP address spaces are 10.0.0.0-10.255.255.255; 172.16.0.0-172.31.255.255; and 192.168.0.0-192.168.255.255.

On a LAN, private IP addresses are assigned to individual computers and/or NICs. A common way to assign a private IP address to a computer and/or NIC is to use a Dynamic Host Configuration Protocol (DHCP) server. A DHCP server allocates an IP address to a client in one of three ways: manual allocation, automatic allocation, or dynamic allocation.

For manual allocation, a DHCP server allocates an IP address based on a table of MAC and IP address pairs. This table is manually created by the server administrator. Essentially, the IP address is statically assigned to a MAC address until the administrator changes it and only MAC address in the table are able to get an IP address. Typically, the client must know of the IP address that is available to it. While this may work well for a small network with few devices that do not change, it does not scale well to larger networks or networks with changing devices due to the need to update the table.

Using manual allocation, an administrator sets a range of IP addresses that may be assigned. The DHCP server "permanently" assigns an IP address from this range to a client. Typically, the client must know of the IP address that is available to it. This again requires some administrative maintainence.

The third DHCP assignment technique is dynamic allocation. The DHCP server "leases" an IP address from a range of IP address allocated by an administrator to a NIC that requests one. After a pre-determined amount of time (such as five days, one day,. etc.) the lease on the IP address expires and the NIC must request a new IP address from the DHCP server. This leasing technique allows for the dynamic reallocation of IP addresses. For example, a DHCP server may lease an first IP address to a particular NIC for a period of one day on a Monday and on Tuesday assign a second (and different) IP address the same NIC while re-assigning the first IP address to a different NIC. Generally, the DHCP server attempts to assign the same IP address to the same MAC but this is not always possible.

FIG. 2 illustrates an exemplary communication between computers through a network. Computers A 201, B 205, and C 209 each have a unique IP address and a NIC card 203, 207, and 211 with a unique MAC address. The IP addresses of computers B 205 and C 209 have been assigned by router 213. As described earlier, these IP addresses could be dynamically, manually, or automatically assigned. Router 213 also as its own unique IP address which is accessible by computer A through the network 215.

Computer A 201 communicates to computers B 205 and C 209 through the router 213. The router 213 is connected to the network with a single public address or multiple public addresses. As packets move from a computer to the network 215, the source address in each packet is translated from the private addresses to the public address(es). The router 213 tracks basic data about each active connection (such as the destination address and port). When a reply returns to the router 213, it uses the connection tracking data it stored during the outbound phase to determine which computer (B 205 or C 209) to forward the reply.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Networks

As described earlier, the router 110 of the prior art simply routes packets to and from a network and the Internet. While the router may log that a transaction has occurred (packets have been routed), it does not capture, analyze, or store the content contained in the packets.

Figure 3:
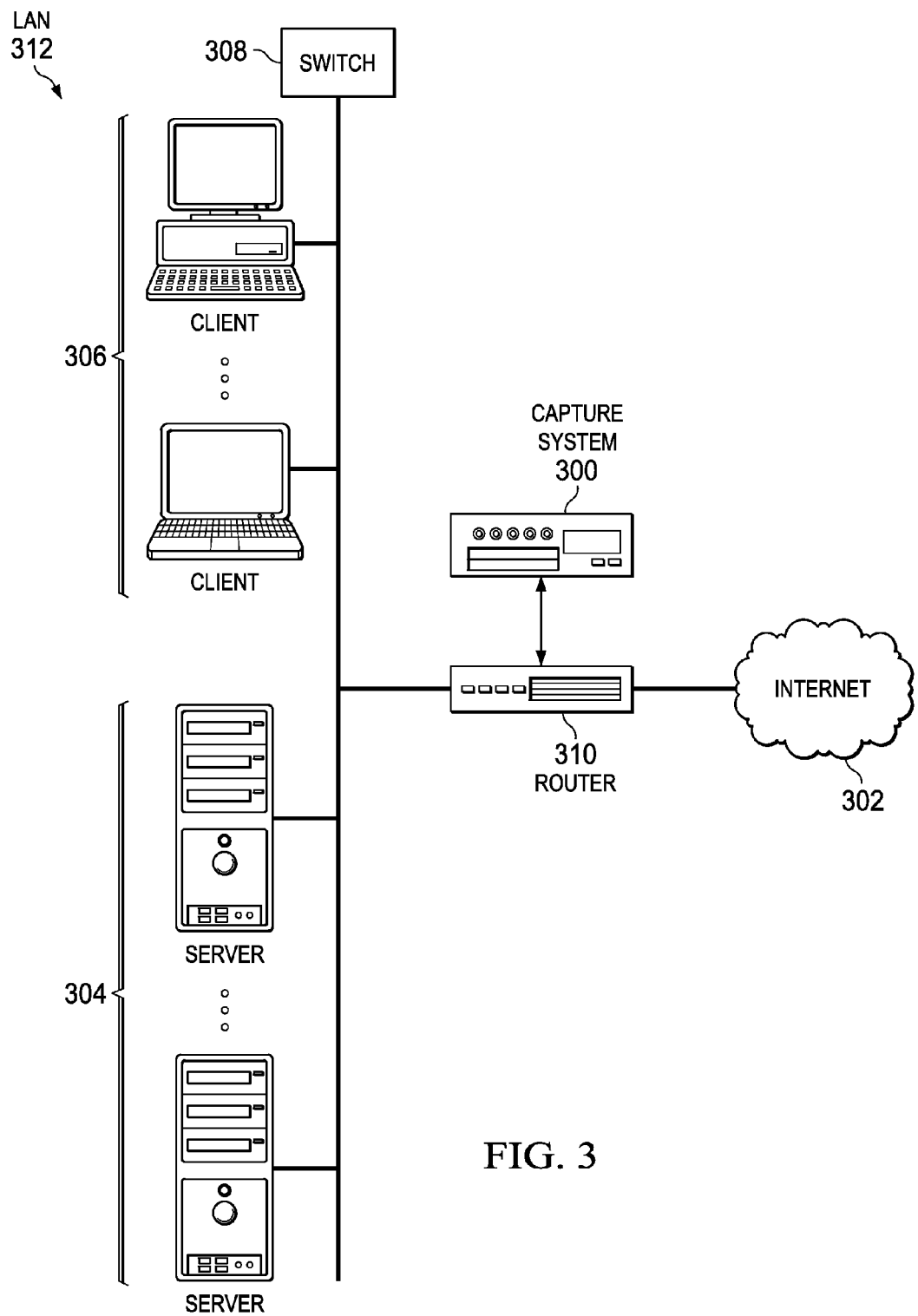
FIG. 3 is a block diagram illustrating the capture system according to one embodiment of the present invention.

FIG. 3 illustrates an embodiment of a system utilizing a capture device. In FIG. 3, the router 310 is also connected to a capture system 300 in addition to the Internet 302 and LAN 312. Generally, the router 310 transmits the outgoing data stream to the Internet 302 and a copy of that stream to the capture system 300. The router 310 may also send incoming data to the capture system 300 and LAN 312.

However, other configurations are possible. For example, the capture system 300 may be configured sequentially in front of or behind the router 310. In systems where a router is not used, the capture system 300 is located between the LAN 312 and the Internet 302. In other words, if a router is not used the capture system 300 forwards packets to the Internet. In one embodiment, the capture system 300 has a user interface accessible from a LAN-attached device such as a client 306.

The capture system 300 intercepts data leaving a network such as LAN 312. In an embodiment, the capture system also intercepts data being communicated internal to a network such as LAN 312. The capture system 300 reconstructs the documents leaving the network 100 and stores them in a searchable fashion. The capture system 300 is then usable to search and sort through all documents that have left the network 100. There are many reasons such documents may be of interest, including network security reasons, intellectual property concerns, corporate governance regulations, and other corporate policy concerns. Exemplary documents include, but are not limited to, Microsoft Office documents, text files, images (such as JPEG, BMP, GIF, etc.), Portable Document Format (PDF) files, archive files (such as GZIP, ZIP, TAR, JAR, WAR, RAR, etc.), email messages, email attachments, audio files, video files, source code files, executable files, etc.

Capture System

Figure 4:
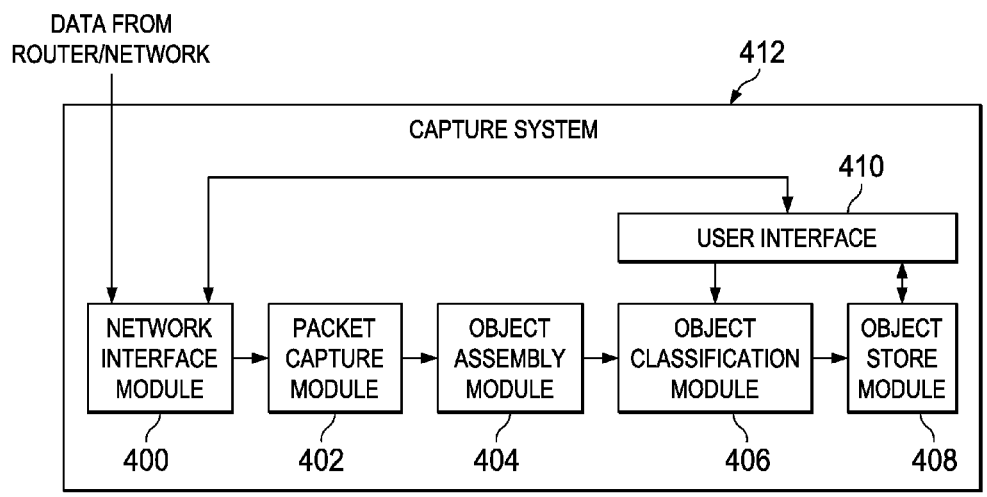
FIG. 4 is a block diagram illustrating a capture system according to one embodiment of the present invention.

FIG. 4 shows an embodiment of a capture system in greater detail. A capture system (such as capture system 300 or 412)

may also be referred to as a content analyzer, content or data analysis system, or other similar name. For simplicity, the capture system has been labeled as capture system 412. However, the discussion regarding capture system 412 is equally applicable to capture system 300. A network interface module 400 receives (captures) data from a network or router. Exemplary network interface modules 400 include network interface cards (NICs) (for example, Ethernet cards). More than one NIC may be present in the capture system 412.

Captured data is passed to a packet capture module 402 from the network interface module 400. The packet capture module 402 extracts packets from this data stream. Packet data is extracted from a packet by removing the headers and checksums from the packet. The packet capture module 402 may extract packets from multiple sources to multiple destinations for the data stream. One such case is asymmetric routing where packets from source A to destination B travel along one path but responses from destination B to source A travel along a different path. Each path may be a separate "source" for the packet capture module 402 to obtain packets.

An object assembly module 404 reconstructs the objects being transmitted from the packets extracted by the packet capture module 402. When a document is transmitted, such as in email attachment, it is broken down into packets according to various data transfer protocols such as Transmission Control Protocol/Internet Protocol (TCP/IP), UDP, HTTP, etc. The object assembly module 404 is able to reconstruct the original or reasonably equivalent document from the captured packets. For example, a PDF document would be broken down into packets before being transmitted from a network, these packets are reconfigurable to form the original (or reasonable equivalent) PDF. A complete data stream is obtained by reconstruction of multiple packets. The process by which a packet is created is beyond the scope of this application.

Figure 5:
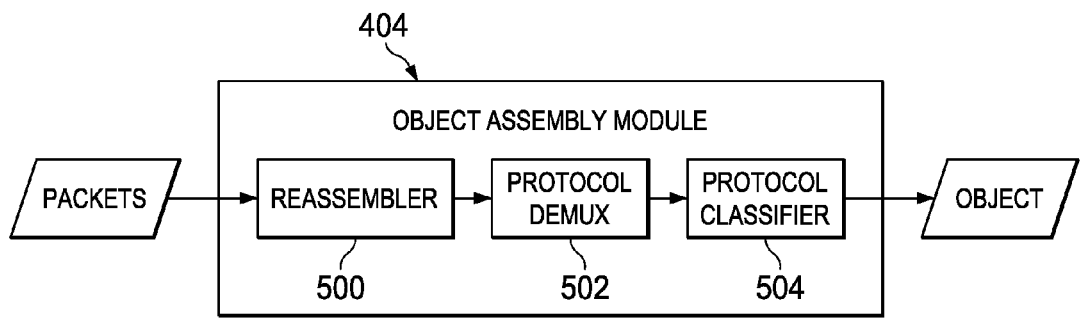
FIG. 5 is a block diagram illustrating an object assembly module according to one embodiment of the present invention.

FIG. 5 illustrates an embodiment of an object assembly module. This object assembly module 404 includes a reassembler 500, protocol demultiplexer (demux) 502, and a protocol classifier 504. Packets entering the object assembly module 404 are provided to the reassembler 500. The reassembler 500 groups (assembles) the packets into at least one unique flow. An exemplary flow includes packets with identical source IP and destination IP addresses and/or identical TCP source and destination ports. In other words, the reassembler 500 organizes a packet stream by sender and recipient.

The reassembler 500 begins a new flow upon the observation of a starting packet. This starting packet is normally defined by the data transfer protocol being used. For TCP/IP, the starting packet is generally referred to as the "SYN" packet. The flow terminates upon observing a finishing packet (for example, a "Reset" or "FIN" packet in TCP/IP). If the finishing packet is observed by the reassembler 500 within a pre-determined time constraint, the flow terminates via a timeout mechanism. A TCP flow contains an ordered sequence of packets that may be assembled into a contiguous data stream by the reassembler 500. Thus, a flow is an ordered data stream of a single communication between a source and a destination.

The flow assembled by the reassembler 500 is provided to a protocol demultiplexer (demux) 502. In an embodiment, the protocol demux 502 sorts assembled flows using ports, such as TCP and/or UDP ports, by performing a speculative classification of the flow contents based on the association of well-known port numbers with specified protocols. For example, Web Hyper Text Transfer Protocol (HTTP) packets (such as, Web traffic packets) are typically associated with TCP port 80, File Transfer Protocol (FTP) packets with TCP port 20, Kerberos authentication packets with TCP port 88, etc. Thus, the protocol demux 502 separates the different protocols that exist in a flow.

A protocol classifier 504 may further sort the flows in addition to the sorting done by the protocol demux 502. The protocol classifier 504 (operating either in parallel or in sequence to the protocol demux 502) applies signature filters to a flow to attempt to identify the protocol based solely on the transported data. Furthermore, the protocol classifier 504 may override the classification assigned by the protocol demux 502. The protocol classifier 504 uses a protocol's signature(s) (such as, the characteristic data sequences of a defined protocol) to verify the speculative classification performed by the protocol demux 502. For example, if an individual or program attempted to masquerade an illicit communication (such as file sharing) using an apparently benign port (for example, TCP port 80), the protocol classifier 404 would use the HTTP protocol signature(s) to verify the speculative classification performed by protocol demux 502.

An object assembly module, such as object assembly module 404 outputs each flow, organized by protocol, which represent the underlying objects being transmitted. These objects are passed to the object classification module 406 (also referred to as the "content classifier") for classification based on content. A classified flow may still contain multiple content objects depending on the protocol used. For example, a single flow using HTTP may contain over 100 objects of any number of content types. To deconstruct the flow, each object contained in the flow is individually extracted and decoded, if necessary, by the object classification module 406.

The object classification module 406 uses the inherent properties and/or signatures of various documents to determine the content type of each object. For example, a Word document has a signature that is distinct from a PowerPoint document or an email. The object classification module 406 extracts each object and sorts them according to content type. This classification prevents the transfer of a document whose file extension or other property has been altered. For example, a Word document may have its extension changed from .doc to .dock but the properties and/or signatures of that Word document remain the same and detectable by the object classification module 406. In other words, the object classification module 406 does more than simple extension filtering.

The object classification module 406 may also determine whether each object should be stored or discarded. This determination is based on definable capture rules used by the object classification module 406. For example, a capture rule may indicate that all Web traffic is to be discarded. Another capture rule could indicate that all PowerPoint documents should be stored except for ones originating from the CEO's IP address. Such capture rules may be implemented as regular expressions or by other similar means.

The capture rules may be authored by users of a capture system. The capture system may also be made accessible to any network-connected machine through the network interface module 400 and/or user interface 410. In one embodiment, the user interface 410 is a graphical user interface providing the user with friendly access to the various features of the capture system 412. For example, the user interface 410 may provide a capture rule authoring tool that allows any capture rule desired to be written. These rules are then applied by the object classification module 406 when determining whether an object should be stored. The user interface 410 may also provide pre-configured capture rules that the user selects from along with an explanation of the operation of such standard included capture rules. Generally, by default, the capture rule(s) implemented by the object classification module 406 captures all objects leaving the network that the capture system is associated with.

Figure 6:
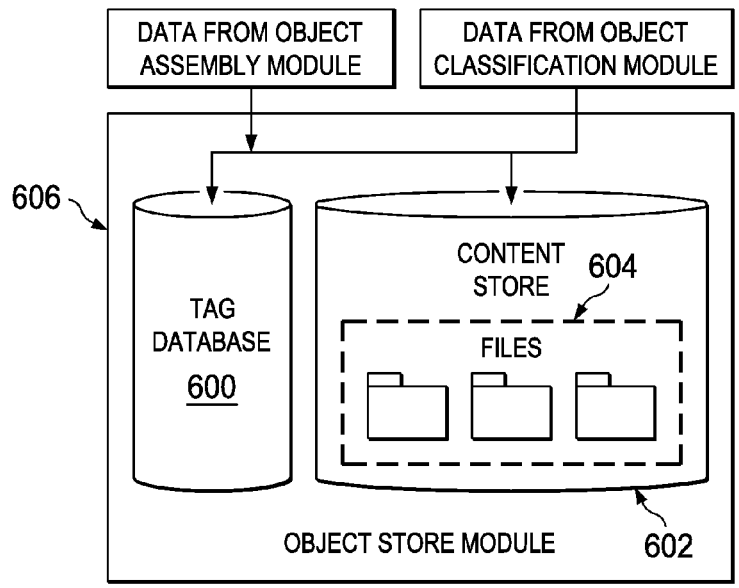
FIG. 6 is a block diagram illustrating an object store module according to one embodiment of the present invention.

If the capture of an object is mandated by one or more capture rules, the object classification module 406 may determine where in the object store module 408 the captured object should be stored. FIG. 6 illustrates an embodiment of an object store module. Within the content store 602 are files 604 grouped up by content type. Thus, for example, if an object classification module (such as object classification module 406) determines that an object is a Word document that should be stored, it can store it in the file 604 reserved for Word documents. The object store module 408 may be internal to a capture system or external (entirely or in part) using, for example, some network storage technique such as network attached storage (NAS), and storage area network (SAN), or other database.

In an embodiment, the content store 602 is a canonical storage location that is simply a place to deposit the captured objects. The indexing of the objects stored in the content store 602 is accomplished using a tag database 600. The tag database 600 is a database data structure in which each record is a "tag" that indexes an object in the content store 602 and contains relevant information (metadata) about the stored object. An example of a tag record in the tag database 600 that indexes an object stored in the content store 602 is set forth in Table 1:

TABLE 1

| Field Name | Definition (Relevant Information) |
| --- | --- |
| MAC Address | NIC MAC address |
| Source IP | Source IP Address of object |
| Destination IP | Destination IP Address of object |
| Source Port | Source port number of object |
| Destination Port | Destination port number of the object |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |

There are various other possible tag fields and some tag fields listed in Table 1 may not be used. In an embodiment, the tag database 600 is not implemented as a database and another data structure is used.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_-Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects ); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The mapping of tags to objects may be obtained by using unique combinations of tag fields to construct an object's name. For example, one such possible combination is an ordered list of the source IP, destination IP, source port, destination port, instance and timestamp. Many other such combinations including both shorter and longer names are possible. A tag may contain a pointer to the storage location where the indexed object is stored.

The objects and tags stored in the object store module 408 may be interactively queried by a user via the user interface 410. In one embodiment, the user interface interacts with a web server (not shown) to provide the user with Web-based access to the capture system 412. The objects in the object store module 408 are searchable for specific textual or graphical content using exact matches, patterns, keywords, and/or various other attributes.

For example, the user interface 410 may provide a query-authoring tool (not shown) to enable users to create complex searches of the object store module 408. These search queries are provided to a data mining engine (not shown) that parses the queries the object store module. For example, tag database 600 may be scanned and the associated object retrieved from the content store 602. Objects that matched the specific search criteria in the user-authored query are counted and/or displayed to the user by the user interface 410.

Searches may be scheduled to occur at specific times or at regular intervals. The user interface 410 may provide access to a scheduler (not shown) that periodically executes specific queries. Reports containing the results of these searches are made available to the user at runtime or at a later time such as generating an alarm in the form of an e-mail message, page, system log, and/or other notification format.

Figure 1:
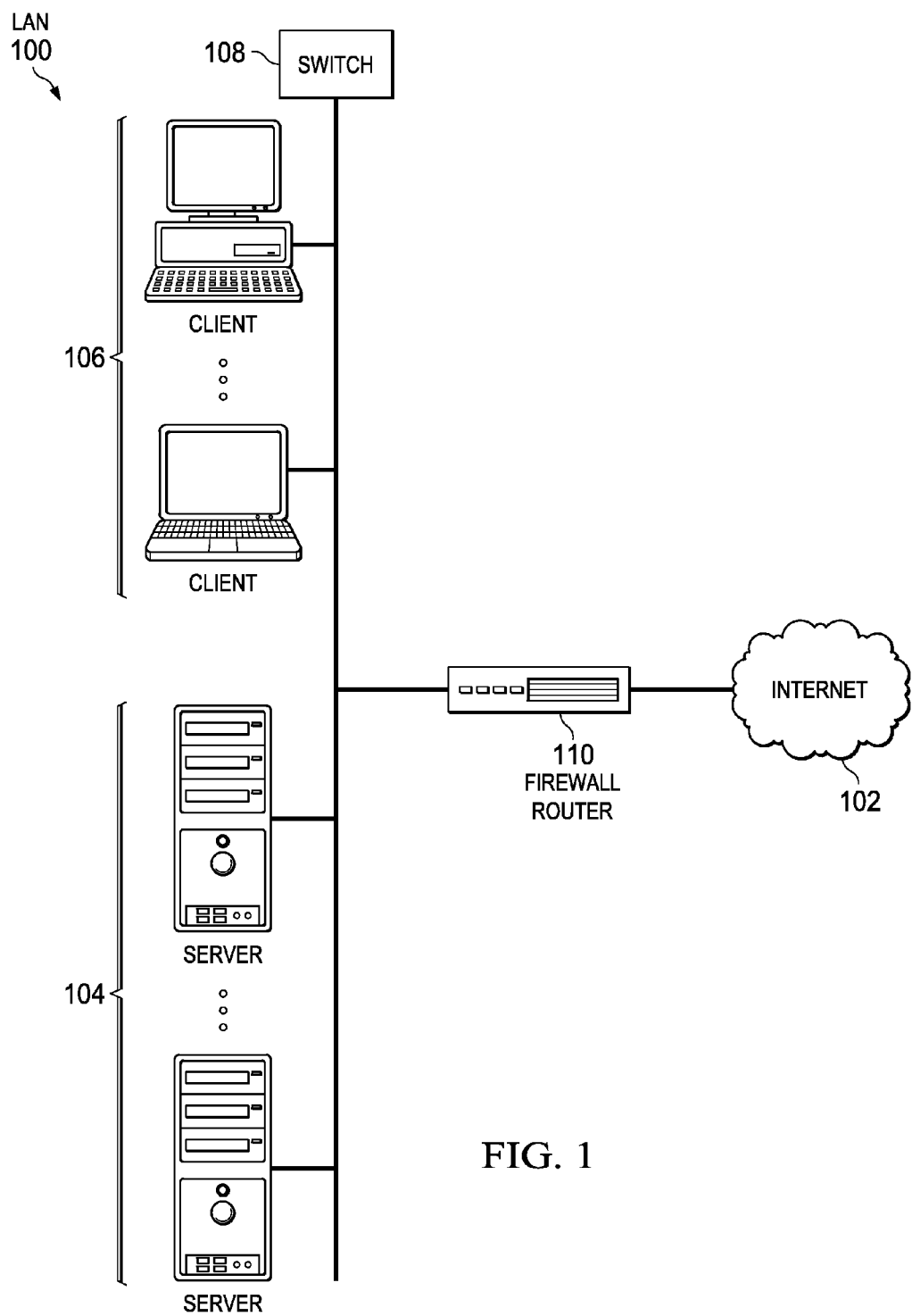
FIG. 1 is a block diagram illustrating a computer network connected to the Internet.
Figure 2:
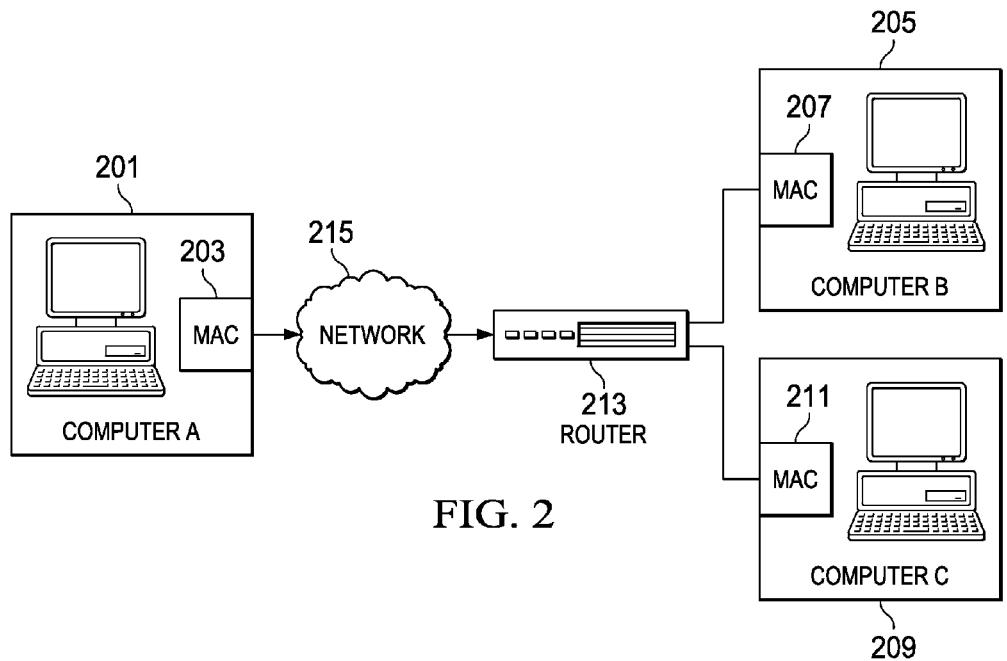
FIG. 2 is a block diagram illustrating one configuration of communications between computers through a network.

Generally, a capture system has been described above as a stand-alone device. However, capture systems may be implemented on any appliance capable of capturing and analyzing data from a network. For example, the capture system 410 described above could be implemented on one or more of the servers or clients shown in FIG. 1. Additionally, a capture system may interface with a network in any number of ways including wirelessly.

Document Registration

The capture system described above implements a document registration scheme. A user registers a document with a capture system, the system then alerts the user if all or part of the content in the registered document is attempting to, or leaving, the network. Thus, un-authorized documents of various formats (e.g., Microsoft Word, Excel, PowerPoint, source code of any kind, text are prevented) are prevented from leaving an enterprise. There are great benefits to any enterprise that keeps its intellectual property, and other critical, confidential, or otherwise private and proprietary content from being mishandled. Sensitive documents are typically registered with the capture system 200, although registration may be implemented using a separate device.

Figure 7:
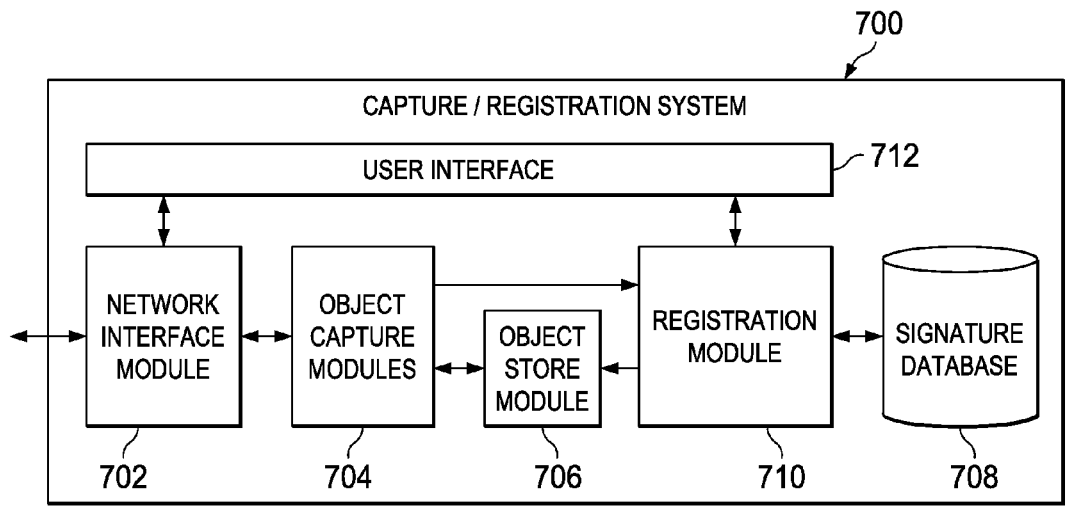
FIG. 7 is a block diagram illustrating registration module according to one embodiment of the present invention.

FIG. 7 illustrates an embodiment of a capture/registration system. The capture/registration system 700 has components which are used in a similar number similar or identical to the capture system 412 shown in FIG. 4, including the network interface module 702, the object store module 706, user interface 712, and object capture modules 704 (the packet capture 402, object assembly 404, and object classification 406 modules of FIG. 4).

The capture/registration system 700 includes a registration module 710 interacting with a signature storage 708 (such as a database) to help facilitate a registration scheme. There are numerous ways to register documents. For example, a document may be electronically mailed (e-mailed), uploaded to the registration system 700 (for example through the network interface module 702 or through removable media), the registration system 700 scanning a file server (registration server) for documents to be registered, etc. The registration process may be integrated with an enterprise's document management systems. Document registration may also be automated and transparent based on registration rules, such as "register all documents," "register all documents by specific author or IP address," etc.

After being received, classified, etc., a document to be registered is passed to the registration module 710. The registration module 710 calculates a signature or a set of signatures of the document. A signature associated with a document may be calculated in various ways. An exemplary signature consists of hashes over various portions of the document, such as selected or all pages, paragraphs, tables and sentences. Other possible signatures include, but are not limited to, hashes over embedded content, indices, headers, footers, formatting information, or font utilization. A signature may also include computations and meta-data other than hashes, such as word Relative Frequency Methods (RFM)—Statistical, Karp-Rabin Greedy-String-Tiling-Transposition, vector space models, diagrammatic structure analysis, etc.

The signature or set of signatures associated on a document is stored in the signature storage 708. The signature storage 708 may be implemented as a database or other appropriate data structure as described earlier. In an embodiment, the signature storage 708 is external to the capture system 700.

Registered documents are stored as objects in the object store module 706 according to the rules set for the system. In an embodiment, only documents are stored in the content store 706 of the object system network. These documents have no associated tag since many tag fields do not apply to registered documents.

As set forth above, the object capture modules 704 extract objects leaving the network and store various objects based on capture rules. In an embodiment, all extracted objects (whether subject to a capture rule or not) are also passed to the registration module for a determination whether each object is, or includes part of, a registered document.

The registration module 710 calculates the set of one or more signatures of an object received from the object capture modules 704 in the same manner as the calculation of the set of one or more signatures of a document received from the user interface 712 to be registered. This set of signatures is then compared against all signatures in the signature database 708. However, parts of the signature database may be excluded from a search to decrease the amount comparisons to be performed.

A possible unauthorized transmission is detectable if any one or more signatures in the set of signatures of an extracted object matches one or more signatures in the signature database 708 associated with a registered document. Detection tolerances are usually configurable. For example, the system may be configured so that at least two signatures must match before a document is deemed unauthorized. Additionally, special rules may be implemented that make a transmission authorized (for example, if the source address is authorized to transmit any documents off the network).

Figure 8:
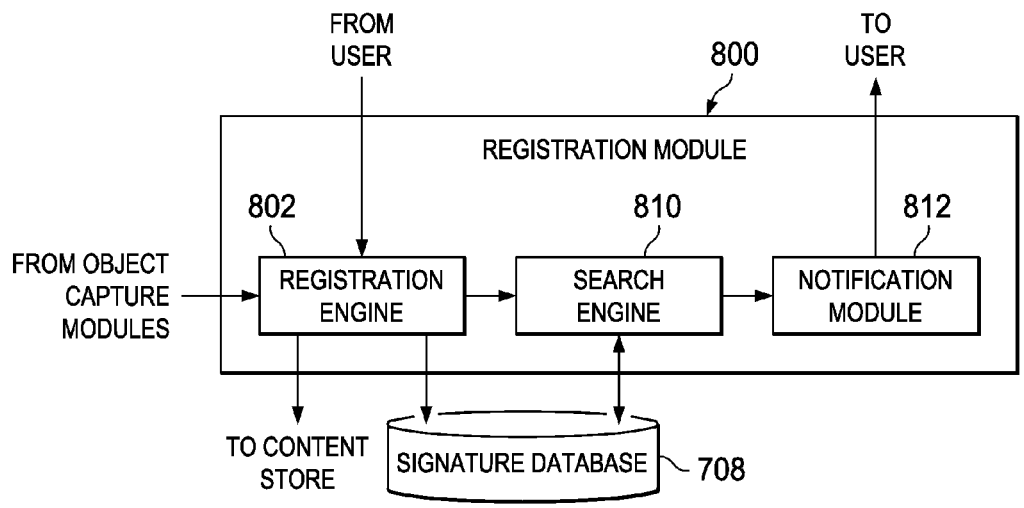
FIG. 8 illustrates an embodiment of a registration module.

An embodiment of a registration module is illustrated in FIG. 8. As discussed above, a user may select a document to be registered. The registration engine 802 generates signatures for the document and forwards the document to content storage and the generated signatures to the signature database 708. Generated signatures are associated with a document, for example, by including a pointer to the document or to some attribute to identify the document.

The registration engine calculates signatures for a captured object and forwards them to the search engine 810. The search engine 810 queries the signature database 708 to compare the signatures of a captured object to the document signatures stored in the signature database 708. Assuming for the purposes of illustration, that the captured object is a Word document that contains a pasted paragraph from registered PowerPoint document, at least one signature of registered PowerPoint signatures will match a signature of the captured Word document. This type of event is referred to as the detection of an unauthorized transfer, a registered content transfer, or other similarly descriptive term.

When a registered content transfer is detected, the transmission may be halted or allowed with or without warning to the sender. In the event of a detected registered content transfer, the search engine 810 may activate the notification module 812, which sends an alert to the registered document owner. The notification module 812 may send different alerts (including different user options) based on the user preference associated with the registration and the capabilities of the registration system.

An alert indicates that an attempt (successful or unsuccessful) to transfer a registered content off the network has been made. Additionally, an alert may provide information regarding the transfer, such as source IP, destination IP, any other information contained in the tag of the captured object, or some other derived information, such as the name of the person who transferred the document off the network. Alerts are provided to one or more users via e-mail, instant message (IM), page, etc. based on the registration parameters. For example, if the registration parameters dictate that an alert is only to be sent to the entity or user who requested registration of a document then no other entity or user will receive an alert.

If the delivery of a captured object is halted (the transfer is not completed), the user who registered the document may need to provide consent to allow the transfer to complete. Accordingly, an alert may contain some or all of the information described above and additionally contain a selection mechanism, such as one or two buttons—to allow the user to indicate whether the transfer of the captured object is eligible for completing. If the user elects to allow the transfer, (for example, because he is aware that someone is emailing a part of a registered document (such as a boss asking his secretary to send an email), the transfer is executed and the captured object is allowed to leave the network.

If the user disallows the transfer, the captured object is not allowed off of the network and delivery is permanently halted. Several halting techniques may be used such as having the registration system proxy the connection between the network and the outside, using a black hole technique (discarding the packets without notice if the transfer is disallowed), a poison technique (inserting additional packets onto the network to cause the sender's connection to fail), etc.

Figure 9:
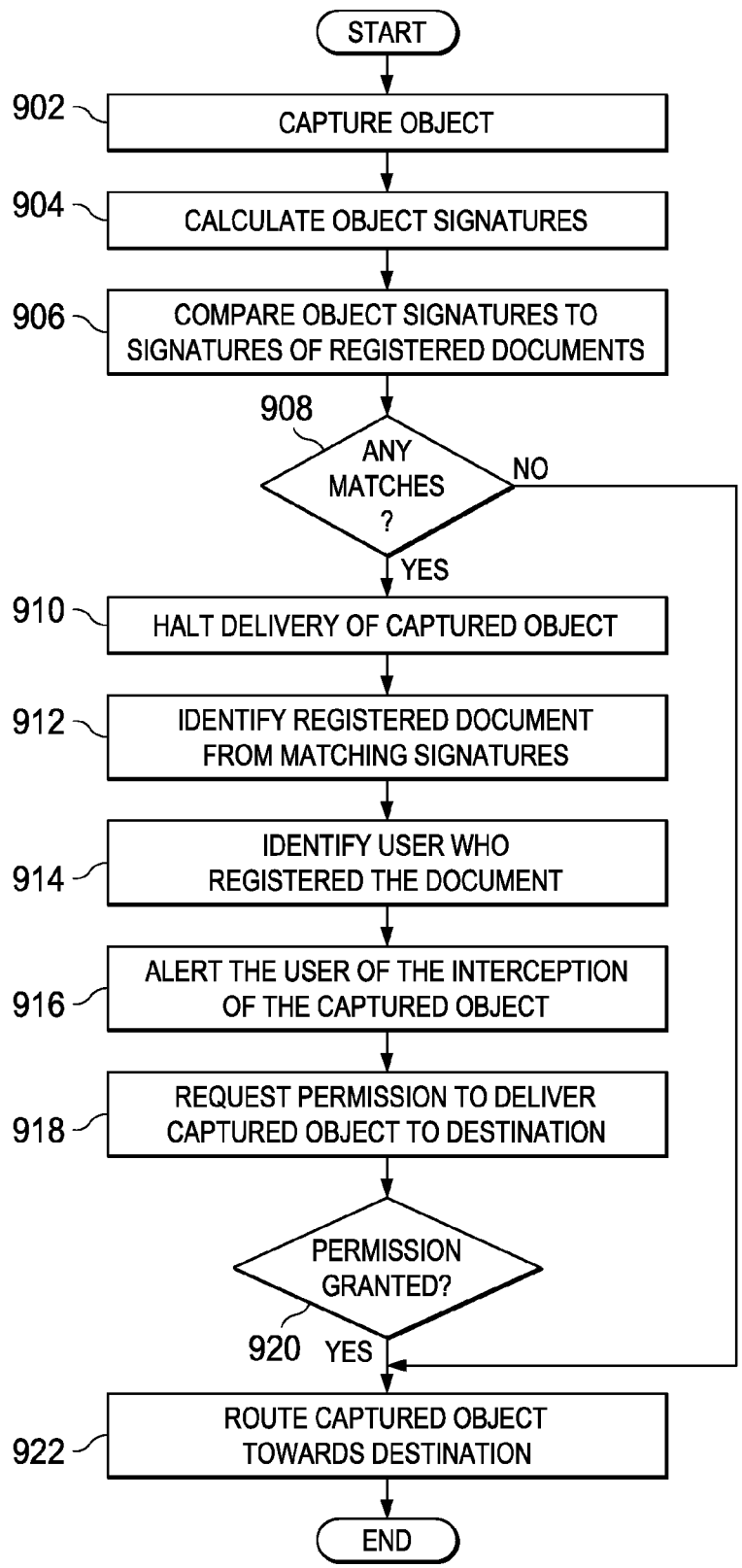
FIG. 9 is a flow diagram illustrating an embodiment of a flow for a registration module.

FIG. 9 illustrates an embodiment of the flow of the operation of a registration module. An object is captured at 902. This object was sent from an internal network source and designated for delivery inside and/or outside of the network.

A signature or signatures are generated for this captured object at 904. This signature or signatures are generated in a manner as described earlier. The signatures of the captured document are compared to the signatures of registered documents at 906. For example, the search engine 810 queries the signature database which houses the signatures for registers documents and compares these registered document signatures to the signatures generated for the captured document.

If there are no matches at 908, then the captured object is routed toward its destination at 922. This routing is allowed to take place because the captured object has been deemed to not contain any material that has been registered with the system as warranting protection. If there is a match at 908, further processing is needed.

In an embodiment, the delivery of the captured object is halted at 910. Halting delivery prevents any questionable objects from leaving the network. Regardless if the delivery is halted or not, the registered document that has signatures that match the captured object's signatures is identified at 912. Furthermore, the identity of the user or entity that registered the document is ascertained at 914.

The user or entity of the matching registered document is alerted to this attempt to transmit registered material at 916. This alert may be sent to the registered user or entity in real-time, be a part of a log to be checked, or be sent to the registered user or entity at a later point in time. In an embodiment, an alert is sent to the party attempting to transmit the captured object that the captured object contains registered information.

A request to allow delivery of the captured object may be made to the registered user or entity at 918. As described earlier, there are situations in which a captured object that contains registered material should be allowed to be delivered. If the permission is granted at 920, the captured object is routed toward its destination at 922. If permission is not granted, the captured object is not allowed to leave the network.

Signature Generation

There are various methods and processes by which the signatures are generated, for example, in the registration engine 802 in FIG. 8.

Figure 10:
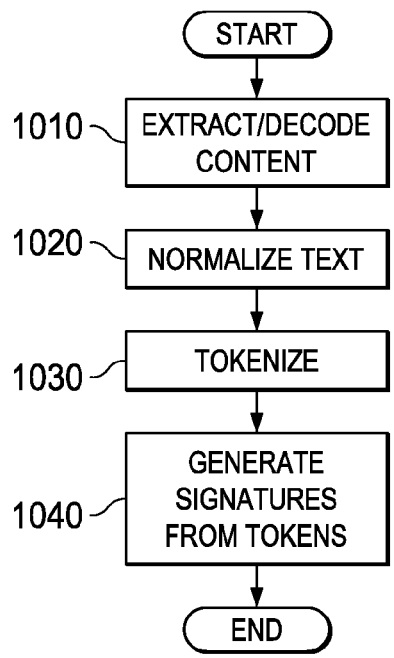
FIG. 10 is a flow diagram illustrating how to generate a signature in accordance with one embodiment.

One embodiment of a flow to generate signatures is illustrated in FIG. 10. The content of a document (register or intercepted) is extracted and/or decoded depending on the type of content contained in the document at 1010. The content is extracted by removing the "encapsulation" of the document. For example, if the document is a Microsoft Word file, then the textual content of the file is extracted and the specific MS Word formatting is removed. If the document is a PDF file, the content has to be additionally decoded, as the PDF format utilizes a content encoding scheme.

To perform the text extraction/decoding at 1010, the content type of the document is detected (for example, from the tag associated with the document). Then, the proper extractor/decoder is selected based on the content type. An extractor and/or decoder used for each content type extracts and/or decodes the content of the document as required. Several off the shelf products are available, such as the PDFtoText software, may be used for this purpose. In one embodiment, a unique extractor and/or decoder is used for each possible content type. In another embodiment, a more generic extractor and/or decoder is utilized.

The text content resulting from the extraction/decoding is normalized at 1020. Normalization includes removing excess delimiters from the text. Delimiters are characters used to separate text, such as a space, a comma, a semicolon, a slash, tab, etc. For example, the extracted text version of an Microsoft Excel spreadsheet may have two slashes between all table entries and the normalized text may have only one slash between each table entry or it may have one space between each table entry and one space between the words and numbers of the text extracted from each entry.

Normalization may also include delimiting items in an intelligent manner. For example, while credit card numbers generally have spaces between them they are a single item. Similarly, e-mail addresses that look like several words are a single item in the normalized text content. Strings and text identified as irrelevant can be discarded as part of the normalization procedure.

In one embodiment, such evaluations are made by comparison to a pattern. For example, a pattern for a social security number may be XXX-XX-XXXX, XXXXXXXXX, or XXX XX XXXX, where each X is a digit from 0-9. An exemplary pattern for an email address is word@word.three-letter-word. Similarly, irrelevant (non-unique) stings, such as copyright notices, can have associated patterns.

The pattern comparison is prioritized in one embodiment. For example, if an email address is considered more restrictive than a proper name and a particular string could be either an email address or a proper name, the string is first tested as a possible email address. A string matching the email pattern is classified as an email address and normalized as such. If, however, it is determined that the string is not an email address, then the string is tested against the proper name pattern (for example, a combination of known names). If this produces a match, then the string is normalized as a proper name. Otherwise the string is normalized as any other normal word.

By comparing the normalization patterns against the string to be normalized in sequence, an implicit pattern hierarchy is established. In one embodiment, the hierarchy is organized such that the more restrictive, or unique, a pattern is, the higher its priority. In other words, the more restrictive the pattern, the earlier it is compared with the string. Any number of normalization patterns useable and the list of patterns may be configurable to account for the needs of a particular enterprise.

Normalization may also include discarding text that is irrelevant for signature generation purposes. For example, text that is known not to be unique to the document may be considered irrelevant. The copyright notice that begins a source code document, such as a C++ source file, is generally not relevant for signature generation, since every source code document of the enterprise has the identical textual notice and would be ignored. Irrelevant text is identified based on matching an enumerated list of known irrelevant text or by keeping count of certain text and thus identifying frequently reoccurring strings (such as strings occurring above a certain threshold rate) as non-unique and thus irrelevant. Other processes to identify irrelevant text include, but are not limited to, identification through pattern matching, identification by matching against a template, and heuristic methods requiring parsing of examples of other documents of the same type.

The delimited text items of the normalized text content are tokenized, and, converted into a list of tokens at 1030. In one embodiment, tokenizing involves only listing the delimited items. In another embodiment, each item is converted to a token of fixed size. Text items may be hashed into a fixed or configurable hash site such as binary number (for example, an 8-bit token). An exemplary hash function that may be used for tokenizing is MD5.

The document signatures are generated from the list of tokens at 1040. An exemplary embodiment of a flow for changing tokens into document signatures is described with reference to FIG. 11. The first M tokens from a list of tokens generated from a document are selected at 1110, where M is an appropriate positive integer value. For example, if M is 10, then the first ten tokens from a list are selected.

Of the selected M tokens, N special tokens are selected at 1120, N also being an appropriate positive integer and is less than, or equal to, M. The N special tokens may be selected at random, in part based on size, and/or in part on obscurity. Tokens that occur less frequently are more obscure and thus more likely to be selected as a special token. A token dictionary may be provided to log the frequency of tokens.

The special tokens may also be selected based on the type of the token as defined by the normalization pattern matched by the source string. As set forth above, during the normalization process, some strings are identified as higher priority text (such as email addresses, credit card numbers, etc.) the tokenization of which results in higher priority tokens. Thus, the selection of the N special tokens may take the source string into account.

Tokens may also have an associated priority value that may be used in selecting the special tokens. The priority value can be based on the priority of the normalization pattern matched by the token (for example, social security number, credit card number, email address, etc.) or based on additional signs of uniqueness, such as the frequency of capitalized letters, and the inclusion of special rare characters (for example, "^" "*" "@", etc.)

A hash signature of the N special tokens is calculated, resulting in one of the document signatures at 1130. The hash is calculable in a number or ways. Special tokens may be hashed individually, or in groups, and the resultant hashes concatenated to form a signature, concatenated prior to the calculation, or hashed without concatenation at all. Any appropriate hash function and/or any combination of these hashing techniques may be utilized.

In one embodiment, before the next M tokens are selected, P tokens of the list of tokens are skipped from the first token of the M tokens. However, if P is zero, the next M tokens would be identical to the current M tokens, and therefore zero is not an allowed value for P. If P is less than M, then the next set of M tokens will overlap with the current set of M tokens. If P is equal to M, then the first token of the next M tokens will immediately follow the last token of the current M tokens. If P is greater than M, then some tokens are skipped between the next and the current M tokens.

A determination is made as to whether all signatures have been generated at 1140. This is be done by observing if there are less than M tokens remaining on the list, hence, the next M tokens cannot be selected. If all signatures for the document have been generated, then the process terminates. However, if more signatures are to be generated for the document the next M tokens are selected by reverting to selecting tokens at 1010.

Figure 11:
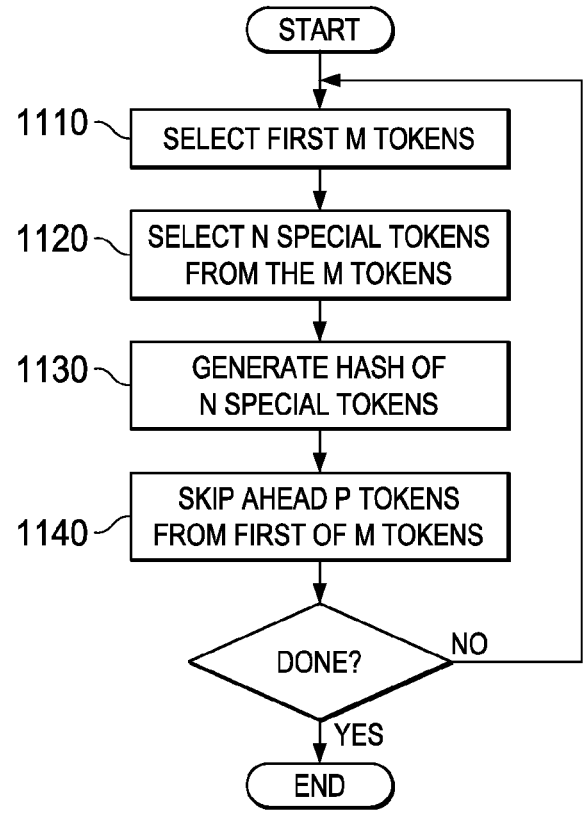
FIG. 11 illustrates a flow for changing tokens into document signatures in accordance with one embodiment.

There are numerous other ways to perform each of the proceedings of FIGS. 10 and 11. Some blocks are skipped entirely in some embodiments. For example, block 1030 in FIG. 10 may be skipped and the signatures generated directly from the normalized text. Regarding FIG. 11, various values may be used for M, N, and P, with each combination generating a different number of signatures. The specific configuration of M, N, and P thus depends on the needs of the enterprise and the volume and content of captured and registered documents. In an embodiment, M ranges between 8-20, N between 8-10, and P between 4-40.

Figures 12, 13:
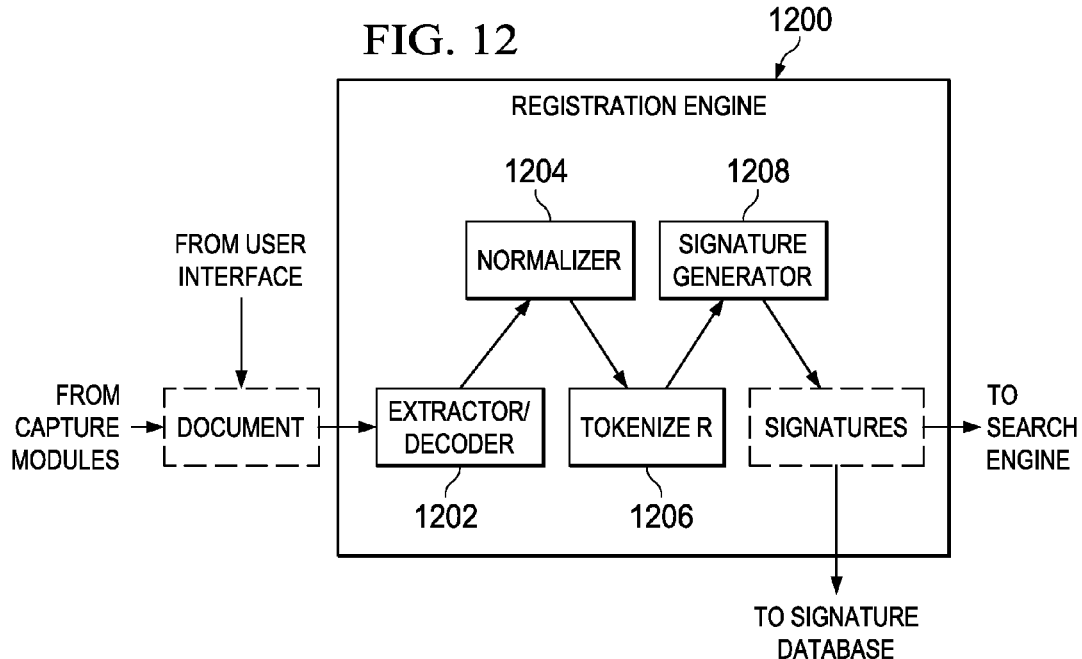
FIG. 12 illustrates an exemplary embodiment of a registration engine that generates signatures for documents.
FIG. 13 illustrates an embodiment for DHCP logging operations.

An embodiment, of a registration engine that generates signatures for documents is illustrated in FIG. 12. The registration engine 1200 accepts documents, and generates signatures over these documents. The document may be one registered via the user interface, or one captured by the capture modules, as described earlier.

The registration engine 1200 includes an extractor/decoder 1202 to perform the functionality described with reference to block 1010 of FIG. 10. The registration engine also includes a normalizer 1204 to perform the functionality described with reference to block 1020 of FIG. 10. A tokenizer 1206 performs the functionality described with reference to 1030 of FIG. 10. A signature generator 1208 performs the functionality described with reference to block 1040 of FIG. 10. The signature 1200 generator may implement the process described with reference to FIG. 11.

As described in the background, IP addresses (especially private IP addresses) assigned to a computer are likely to change over time. A computer could leave the network, the network itself could change, or different IP addresses could be assigned as in the case of dynamic configuration systems such as DHCP (Dynamic Host Configuration Protocol). Because prior systems filtered data based on the destination or source IP address at the time of capture, inconsistencies in a search of the data based on a specific IP address could occur. It could be extremely difficult to search for data that originated from or is going to a particular computer. For example, if a DHCP server assigned a particular computer different IP addresses on different days, then a search based on a single IP address over those different days would not yield the correct result because 1) that IP address would likely return results for more than one computer name, and 2) the traffic associated with that computer when it did not have that IP address would not be returned by the search.

Temporal Identification

When using a dynamic DHCP server, an IP address is assigned to a specific MAC (Media Access Control) address. Unlike an IP address, a MAC address is unique across all computing and networking gear. This uniqueness is assured by incorporating the manufacture's unique identifier with a unique device as subfields within the MAC address. Typically, this MAC address is also related to a computer name in the DHCP log. FIG. 13 illustrates exemplary DHCP logs. In log 1301 (generated at time $T_0$), a user Erik has two different computers on the network that have been assigned IP address by the DHCP server. The first computer is named "Erik PC," has the MAC address "AA-BB-CC-DD-EE-F0," and has an IP address of "192.168.0.3." The second computer is named "Erik Laptop," has the MAC address of "AA-BB-CC-DD-EE-F1," and an IP address of "192.168.0.4."

Log 1303 was generated at time $T_{100}$, which is a point later in time than $T_0$. In this log 1303, the IP address for "Erik PC" has changed but the MAC address has not. As described earlier, it is not uncommon that a particular computer will be assigned different IP addresses at different times on the same network. The IP address for "Erik Laptop" has not changed. However, the network interface card (NIC) card has been replaced and a new MAC address is now associated with "Erik Laptop." The old NIC from "Erik Laptop" is now in the computer named "Newbie Laptop." Accordingly, "Newbie Laptop" now has the MAC address of "AA-BB-CC-DD-EE-F1" and an IP address of "192.168.0.5."

As described earlier, the capture (capture/registration) systems described storing metadata (tag) for captured objects/documents. This metadata includes information about an outgoing or incoming transaction including: the MAC address of the NIC sending (or receiving) the object, the source and/or destination location, the port used, and the protocol used. The metadata also includes a timestamp of when the transaction occurred. With this metadata, a search based on computer name instead of IP address may be performed.

Figure 14:
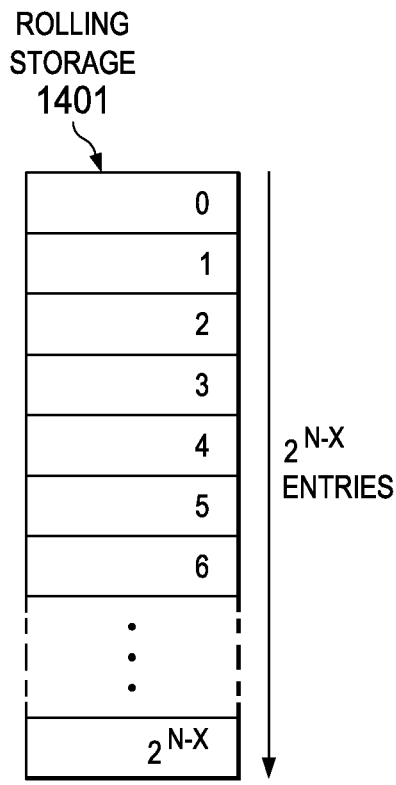
FIG. 14 illustrates an embodiment for rolling storage.

In an embodiment, rolling storage is used to store objects processed by a capture system. Each item is stored sequentially in this storage. FIG. 14 illustrates an exemplary embodiment of rolling storage. Rolling storage 1401 has $2^{N-X}$ entries where N is the number of bits used in the metadata to describe the source and/or destination location and X is the number of bits from the source and/or destination location metadata used to determine which mode the capture system is operating in. X may be zero. In one embodiment, X has the value "one" and allows for a capture system to operate in one of two modes. Two exemplary modes will be discussed below. In an embodiment, the source or destination location is described by a 32-bit number and 1 bit of the 32 bits is used to determine the mode that the capture system is operating in. Of course, any number of bits may be used to describe source or destination location and the mode. Rolling storage may be a part of the object store, separate storage within a capture system, or storage outside of the capture system.

The first mode that the capture system may operate in is the temporal identification mode. In this mode the capture system uses the rolling storage to store objects associated with a particular computer. The association between objects and a computer is determined from one or more log files such as a DHCP log for the network.

Figure 15:
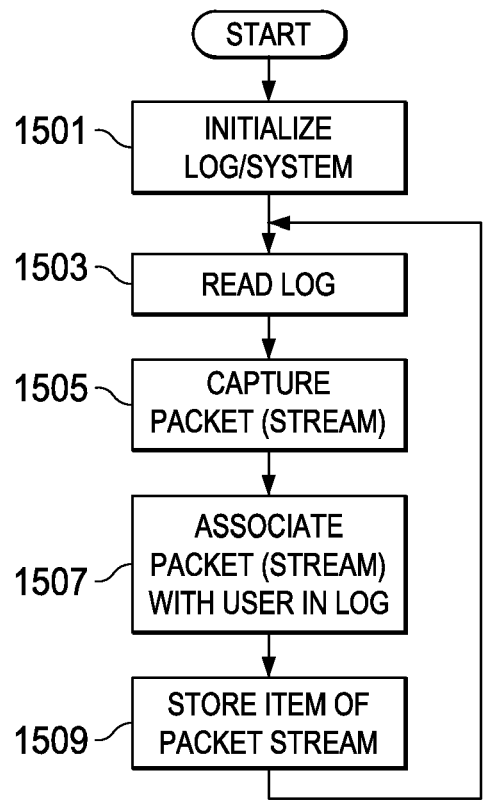
FIG. 15 illustrates an embodiment of a method for associating items processed by a capture system in accordance with one embodiment.

FIG. 15 illustrates an illustrative embodiment of a method associating items processed by a capture system to a computer name. At 1501, a log of IP assignments by MAC addresses (and therefore computer names) is initialized. This log will be populated as the DHCP server(s) assign IP addresses to computers on the network.

The log (or logs) is read at 1503 and the current relationship between MAC addresses, computer names, and IP addresses is discovered. For example, in FIG. 14, values for "Erik PC," "Erik Laptop," and "Newbie Laptop" are stored in a log. The object classification module 406 may perform this reading.

More than one user may use a computer in a normal networked environment. Typically, these users have to log on to the computer and this logon is tracked. The logon logs may also be checked at 1503 (or at a later time) and compared to the DCHP log(s) to determine which user was using a computer at a particular point in time. Accordingly, a search by computer name may determine which computer sent or received traffic and the user sending or receiving the traffic.

A packet (or stream) directed to or from a computer in communication with the capture system is captured at 1505.

Metadata associated with the captured packet is generated at 1507. Exemplary metadata has been described earlier. The metadata may be generated by the object classification module 306.

Since the current relationship between MAC addresses, computer names, and IP addresses is known from the log read at 1503, the packet may be associated with a particular computer at 1509. This association may also be stored as a part of the metadata that was generated at 1507.

The item associated with the packet is stored at 1509. In an embodiment, the item is stored in an available location in rolling storage. If this is the first item to be stored, this location is generally the first location in the storage. However, any storage location may be used as long as subsequent items are stored sequentially after the item stored at 1509.

This process of receiving/sending packets, associating the packets with a computer, and storing items associated with the packets may be repeated. The log or logs may be read at pre-determined intervals, upon a change made to the log or logs, after each instance of storage, etc.

Figure 16:
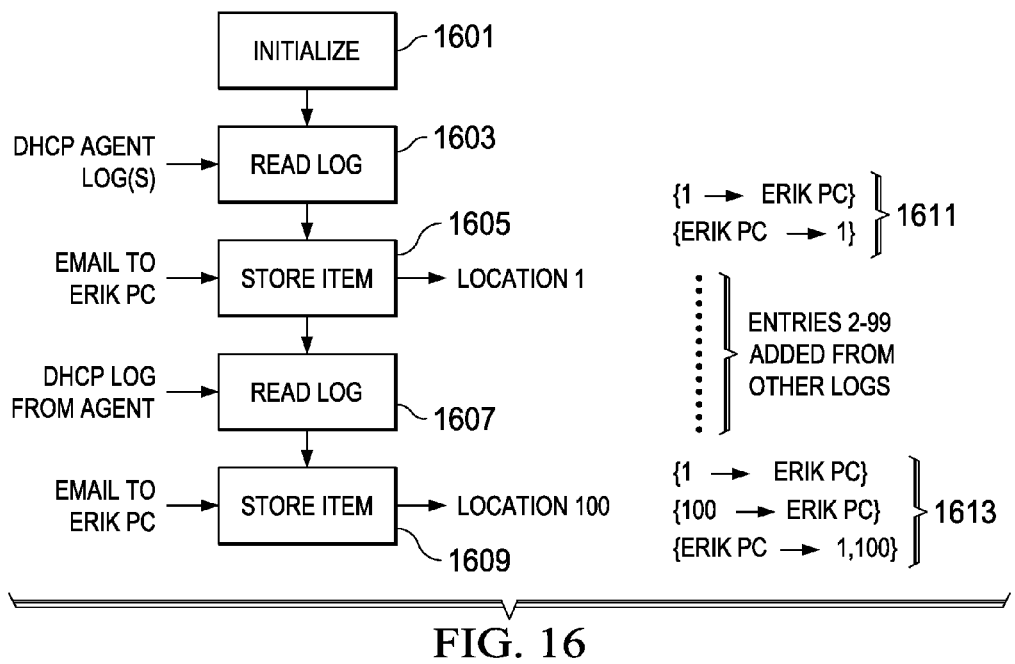
FIG. 16 shows an embodiment of associating items in rolling storage to a computer name.

An example of associating items in rolling storage to a computer name is illustrated in FIG. 16. At 1601, a DHCP log is initialized. This DHCP log will record all of the IP addresses associated with a MAC address/computer name. For this example, the rolling storage 1611 is initially empty.

The log is read at 1603 and indicates that "Erik PC" has the IP address of "192.168.0.3" at $T_1$. Accordingly, the next item sent or received at IP address "192.168.0.3" belongs to "Erik PC" unless the log is re-read and indicates otherwise.

At 1605, an email is received by "Erik PC." The email object is stored in rolling storage 1611 in the first open storage location. In this example this location is the first storage location, or location "1." Accordingly, storage location "1" and its contents are associated with "Erik PC." At 1605, metadata is also generated with respect to the email that was received by "Erik PC." This metadata includes the relationship of the storage location with "Erik PC."

Later at 1607, the DHCP log is re-read and indicates that "Erik PC" is now associated with "192.168.0.5." Accordingly, the next item sent or received at IP address "192.168.0.5" belongs to "Erik PC" unless the log is re-read and indicates otherwise. Of course, items sent or received at IP address "192.168.0.3" at this point in time do not belong to "Erik PC."

An email is sent from "Erik PC" at 1609. During the time between the readings of the DHCP log, several items have been stored in the rolling storage 1611. The first open location after a filled location is at location "100." The email object sent at 1609 is stored in this location and the metadata generated by the capture system for this email includes this information. Accordingly, a search for "Erik PC" will yield the objects stored in locations 1 and 100. In contrast, prior techniques could only search by IP address and not by computer name.

Tiered Location Tagging

The second mode that the capture system may operate in is called tiered location tagging. Tiered location tagging is normally used to describe an internal (such as a corporate) network. Tiered location tagging uses the source/destination address in a packet header to describe who the packet traffic belongs too. This information about who the packet is associated with is saved as a tiered location value in the metadata related to that packet.

The term tiered is used because tiered location value consists of multiple tier component with each tier component describing a different level of abstraction. For example, two or more different tiered location components may be saved for a packet. The first component describes where the packet came from in a very generic/abstract way such as which country. The second component describes what state the packet came from. This component is less abstract (more concrete) than the other component. Accordingly, each component gives a different level of detail about the packet's origins.

Figure 17:
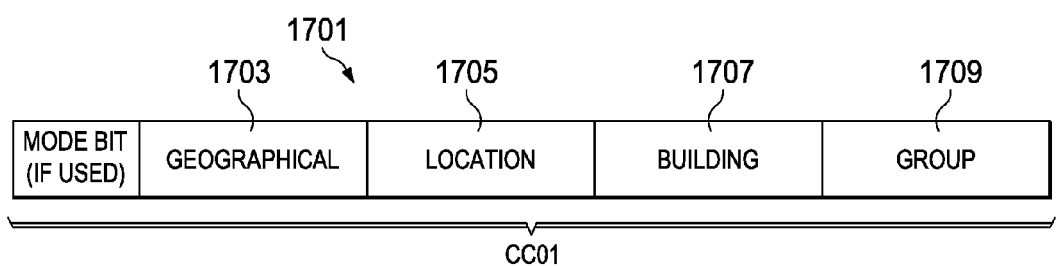
FIG. 17 illustrates an exemplary tiered location metadata value.

FIG. 17 illustrates an exemplary tiered location metadata value. This metadata value 1701 is divided into four tiers/components: geography, location, building, and group. Of course any number of tiers, types of tiers, and size of tiers may be used. For example, a company may have tiers for division, building, floor, and group. Additionally, in this configuration, each tier is 8-bit in size. If a mode bit is used, then one of the tiers would be a 7-bit value.

Tiered location tagging allows for a classification and/or a search based on the level of detail needed for the search. For example, a search for something very specific, such as a search for a particular group, is of a lower level of abstraction (and uses a different tier) than a search for a building which is of a high level of abstraction. In an embodiment, a 32-bit source/destination tiered location tagging metadata value consists of four tiers.

When a packet is received by a capture system, a source location such as an originating IP address is known. Likewise, a destination IP address is known for outgoing traffic. From these source and destination IP addresses the content of the tiers of a tiered location scheme may be determined.

Values for tiers are determinable by several techniques. In a technique, a mapping of IP addresses to tiers is used. Table 3 depicts an exemplary IP to tier mapping:

TABLE 3

| IP Address  | Tier 1 | Tier 2 | Tier 3 | Tier 4 |
|---|---|---|---|---|
| 192.168.0.1 | 0   | 0   | 0   | 1 |
| 192.168.0.2 | 128 | 32  | 65  | 1 |
| 192.168.0.3 | 192 | 64  | 65  | 2 |

TABLE 3-continued

| IP Address  | Tier 1 | Tier 2 | Tier 3 | Tier 4 |
|---|---|---|---|---|
| 192.168.0.4 | 132 | 64 | 2 | 0 |
| 192.168.0.5 | 192 | 64 | 1 | 0 |

As shown in this example, a packet belonging to IP address 192.168.0.1 has a tiered location tagging metadata value of 0001 (or in binary 00000000 00000000 00000000 00000001). IP addresses 192.168.0.1 and 192.168.0.2 share the same tier 4 value. This means that they are related at this level of abstraction. For example, if tier 4 is a group designation and "1" was the designation for the design group then both 192.168.0.1 and 192.168.0.2 come from a design group. However, since they do not share any other tiers in common that is probably the only similarity. As shown, IP addresses may share multiple tiers with other IP addresses.

A separate table may be used to map numerical tier values to more user understandable values. Table 4 illustrates an exemplary mapping of tier values to more user understandable values.

TABLE 4

| Tier Value | Tier 1 | Tier 2 | Tier 3 | Tier 4 |
|---|---|---|---|---|
| 0 | US | Portland | SC4 | Manu. |
| 1 | Israel | Santa Clara | SC1 | Design |
| 2 | Malaysia | Chandler | SC0 | Legal |
| 64 | China | Hong Kong | SC3 | HR |
| 65 | China | Beijing | SC5 | HR |

As shown, a "0" in a tier has a specific meaning. In Tier 1, a "0" indicates the US; in Tier 2, a "0" indicates the city of Portland; etc. To describe the legal department of SC4 in Santa Clara, US, the tiered location tagging metadata value of 0112 (or in binary 00000000 00000001 00000001 00000010). Multiple tier values may also be used to describe the same thing. For example, in Tier 1, values of "64" and "65" both describe China. Dummy values may be used when information is not available. For example, a "255" could be placed in a tier when a known value is not available.

IP address listings are available for purchase or may be built from known data such as internal IP address listings (such as those from DHCP logs) or IP addresses from previous transactions with the capture system that have known traits. For emails and web traffic, the country code may be used to determine the geography. For example, ".us" indicates the United States, ".ru" indicates Russia, ".gov" indicates the United States government, etc. However, this technique is not always reliable in the instance of ".com" traffic and country codes may be spoofed. Keywords found in the traffic may also be searched to determine which tier a packet belongs in. For example, an email with the text "I'm leaving Minnesota for California" probably came from the United States. If there is a tier component for state, then this value may be filled in (source is Minnesota, destination is California).

Figure 18:
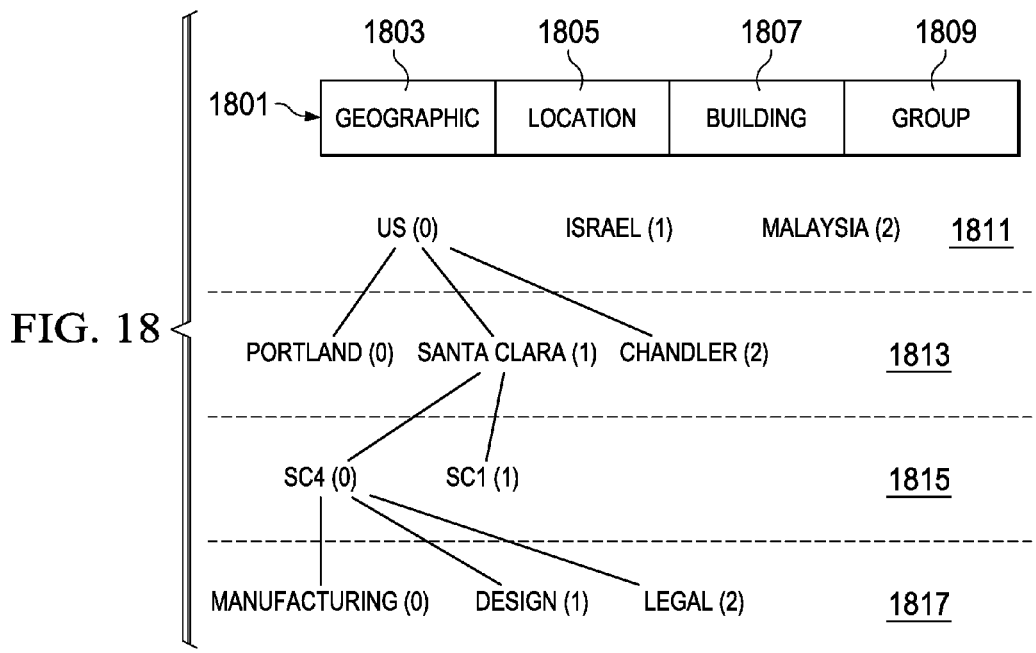
FIG. 18 illustrates an example of a tree structure describing for a tiered location tagging scheme in a corporate environment.

An example of a tree structure describing for a tiered location tagging scheme in a corporate environment is illustrated in FIG. 18. In this tree structure, each lower (child) level is more specific than the (parent) level above it. The 4-tiered location tagging scheme of this example has four levels of abstraction for a corporate structure: geographic (country), location (city in a country), building (in a particular city), and group (range of IP address belonging to a particular group of a building). Entries in each level are assigned a value to be stored in the tiered location tagging metadata value 1801.

The first level 1811 (most abstract) is the geographic component 1803 of the tiered location tagging metadata value 1801. At this level three different countries are shown: United States, Israel, and Malaysia. The US has been designated as 0, Israel as 1, and Malaysia as 2. For a transaction relating to the US, a 0 will be placed in the geographic component 1803.

At the second level 1813, the location component 1805 of the tiered location tagging metadata value 1801 is described. For this particular example, only the United States geographic component's lower levels have been expanded. Of course, the other geographic components may have children. For the United States, there are three locations described: Portland (0), Santa Clara (1), and Chandler (2).

At the third level 1815, the building component 1807 of the tiered location tagging metadata value 1801 is described. Again, only the children from one parent are shown. For Santa Clara, there are two locations described: SC4 (0) and SC1 (1).

At the fourth level 1817, the group component 1809 of the tiered location tagging metadata value 1801 is described. This group component includes different business groups such as manufacturing (0), design (1), and legal (2).

From this 4-tiered location tagging scheme, varying levels of specificity are described by the 4-tiered tag stored in the metadata. For example, an email originating from the design group of SC4 in Santa Clara, USA, the following tiered location value would be 0101 (or 0000000 00000001 00000000 00000001).

A search of the metadata for any combination of the tiers may be made. For example, a search could be made for the design groups all across the company (groups could be in the US, Israel, or Malaysia), design groups in a particular building (such as SC4), design groups at a particular location (such as Santa Clara and/or Portland), etc.

Figure 19:
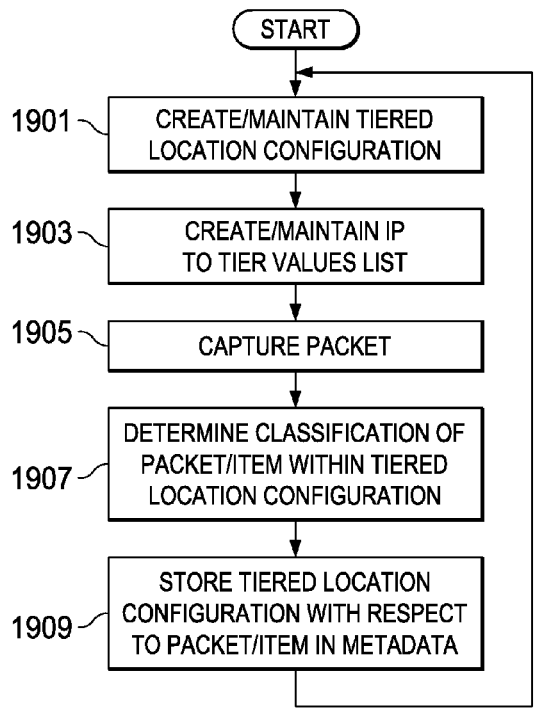
FIG. 19 illustrates an embodiment of a method for associating items processed by a capture system using tiered location tagging.

FIG. 19 illustrates embodiment of a method for associating items processed by a capture system using tiered location tagging.

The tiered location configuration for the capture system is created and/or maintained at 1901. The model for the tiered location configuration used by a capture system may evolve over time. IP address assignments and networks are likely to change and this change may need to be addressed in the tiered location configuration model. For example, the number of bits assigned to a particular component may need to be adjusted. A typical scenario in which this could occur is a business expanding or contracting its number of product groups. If the number goes up, additional bits may need to be dedicated to the group component (if there is one) in the tiered location configuration.

At 1903, a list IP addresses to tier values created and/or maintained. The IP addresses may come from logs of IP address assignments, IP lists created or purchased, etc. This list contains the relationships between IP address and tier configuration information.

At 1905 a packet captured by the capture system. The capturing of packets has been explained in detail previously. From this captured packet (or packets), the tiered location classification of the packet (and its associated item) is determined at 1907. Typically, the tiered location classification is performed by comparing the IP address of the packet to the known tier mapping that the capture system has. For example, the mapping of Table 2 would be used to classify a packet belonging to a particular IP address. The tiered location tagging metadata value for the packet is stored at 1909. This method of associating items processed by a capture system using tiered location tagging may be repeated as necessary.

Attribute Scanning and Tagging

The capture systems and capture/registration systems described above are able to process traffic (create metadata tag information) quickly because they utilize high speed volatile memory (for example, RAM) during the processing without having to go to disk. Prior systems simply either 1) filtered packets on the fly (used packet "sniffing" techniques); or 2) recorded flows (stored streams of data to disk). While flow recording can catch most traffic that was being passed through a system, it does not perform any sort of analysis on the flows that are being recorded. Instead, rather large amounts of processing and storage resources had to be utilized after recording to process the flows.

As high speed volatile memory is typically limited in size (either due to cost or system ability), several factors need to be addressed to utilize high speed volatile memory in this manner. Specifically, carefully attention should be made to the flow rate, the reassembly process(es), and/or the content being transferred and/or filtered. The flow rate is characterized by the number of concurrent sessions that are supported at once by the capture system.

Reassembly is characterized by the number of bytes per flow. This is the amount of memory that is used to figure out what object the flow contains. The amount of memory to make this determination varies with the object. For example, a movie file (such as an AVI, Quicktime, or MPEG file) is quickly known due to the information contained in its header file. Essentially, reassembly asks: 1) How much memory is needed to determine what the object is?; 2) How long should a flow be keep open waiting for data to pass through the capture system?; and 3) Is the flow (and object) interesting or should it be filtered out?

An example when a flow being open could cause a problem is a chat being open but no data being passed through it. This flow ties up resources but does not provide anything useful. It is likely that this flow should either be closed or not monitored at some point and directing limited capture system resources to something more interesting like email. By knowing what type of flow is active rules may be made that address when to determine that a flow is not interesting and move on to another flow.

Filters may be applied based on whether or not a flow is interesting to the capture system (and its operators). For example, emails are typically very interesting to track because they are commonly used to send information (confidential or not) outside of a network. What may not be as interesting, and thus filtered out, is an incoming stream of music from a web-based service such as Yahoo! Music or Napster.

Figure 20:
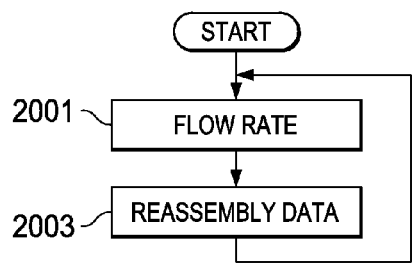
FIG. 20 illustrates a technique for handling this balancing of resources based on flows and reassemblies of flows.

A technique for handling this balancing of resources based on flows and reassemblies of flows of is illustrated by FIG. 20. The flow shown in FIG. 20 is a feedback loop that looks at the flow rate 2001, then the reassembly data 2003, then the flow rate 2001, etc. By knowing the flow rate (number of sessions), the capture system may determine what to look at and for how long. Of course, the reassembly data 2003 may be looked at before the flow rate 2001. In an embodiment, the object classification module performs the balancing.

The amount of high speed volatile memory available is characterized by the number of bytes. For example, the number of bytes of RAM (Random Access Memory) available. This sets the limit that the capture system may use for flow capture and reassembly without having to go to disk. Therefore, the number of sessions multiplied by the size of the sessions must be less than the total size of high speed volatile memory available.

Figure 21:
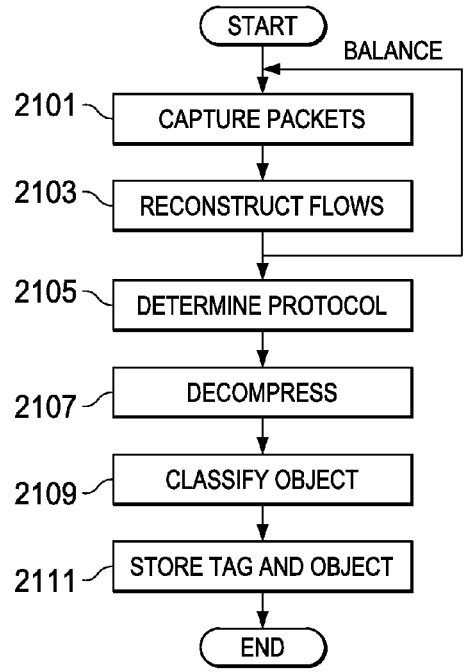
FIG. 21 illustrates an exemplary flow for attribute scanning and tagging in a capture system.

FIG. 21 illustrates an exemplary flow for attribute scanning and tagging in a capture system. Packets are captured by the capture system at 2101. The capture of packets has been discussed earlier. It is at this point in the flow that packet sniffers could perform similar work. However, packet sniffers do not go beyond this point in the flow.

The captured packets are then reassembled into a flow at 2103. Again the reassembly of packets into a flow has been described earlier. For example, the packets may be provided to a reassembler. At this point, the source IP address/port relationship to the destination IP address/port is known. With respect to the flow of FIG. 21, this is the point where flow recorders perform similar work but flow recorders do nothing more.

The protocol of the flow is determined at 2105. Typically this is done by stripping information from a header (such as an SMTP header). Protocol determination may be performed by a protocol demux such as described earlier. This determination may include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. An object is output from 2105.

At 2107, any decompression that may be necessary is performed. For example, if the reconstructed object is an archive file (such as a ZIP or RAR file), then the archive file is un-archived to allow access to the contents stored inside of the file.

The object from 2105 or 2107 is classified at 2109. Attributes (metadata) for the object are created and stored in a tag. The process of creating attributes and storing them has already been discussed.

At 2111, the tag and object are stored in their respective locations. For example, the tag may be stored in a tag database and the object stored in a content store.

A capture system is able to perform the flow described by FIG. 21 by performing the flow capture, flow analysis, and underlying object analysis in high speed volatile memory. Balancing the flow rate and reassembly size issue may be performed periodically or as needed to ensure that the available memory is used properly and that the capture system does not have to go to disk.

Closing Comments

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In one embodiment, a capture system is an appliance constructed using commonly available computing equipment and storage systems capable of supporting the software requirements.

Figure 22:
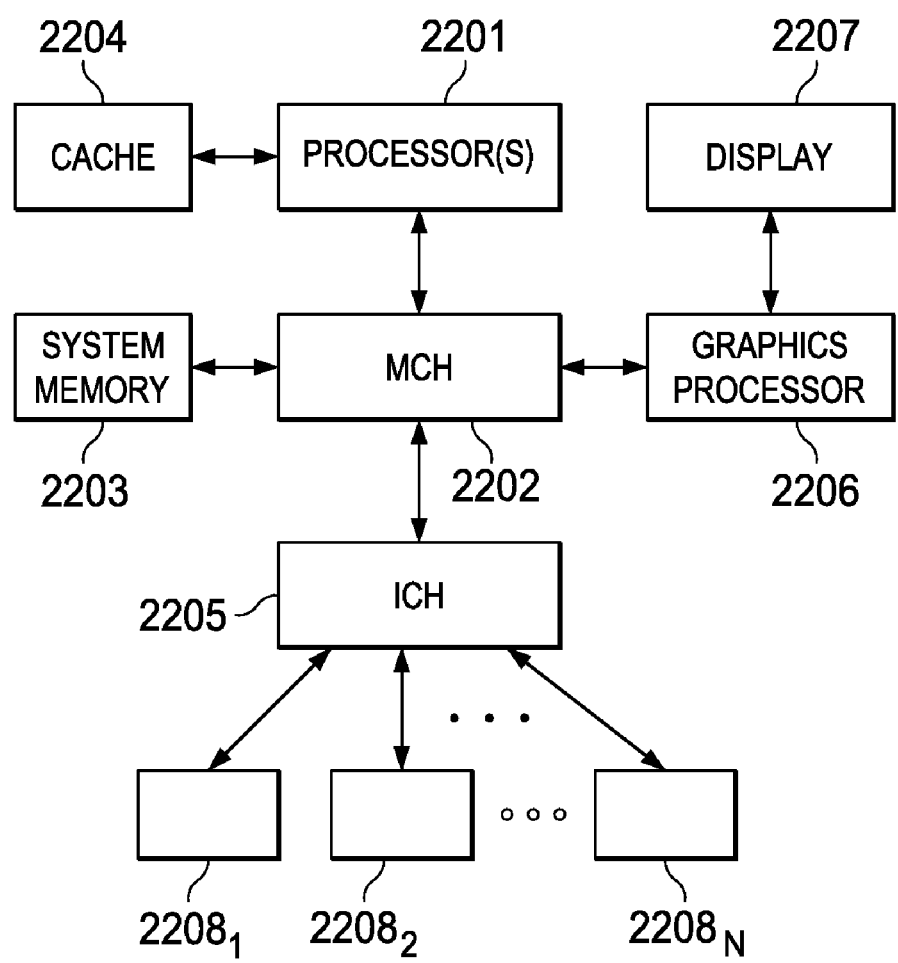
FIG. 22 shows an embodiment of a computing system.

FIG. 22 shows an embodiment of a computing system (e.g., a computer). The exemplary computing system of FIG. 22 includes: 1) one or more processors 2201; 2) a memory control hub (MCH) 2202; 3) a system memory 2203 (of which different types exist such as DDR RAM, EDO RAM, etc,); 4) a cache 2204; 5) an I/O control hub (ICH) 2205; 6) a graphics processor 2206; 7) a display/screen 2207 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 2208.

The one or more processors 2201 execute instructions in order to perform whatever software routines the computing system implements. The instructions frequently involve some sort of operation performed upon data. Both data and instructions are stored in system memory 2203 and cache 2204. Cache 2204 is typically designed to have shorter latency times than system memory 2203. For example, cache 2204 might be integrated onto the same silicon chip(s) as the processor(s) and/or constructed with faster SRAM cells whilst system memory 2203 might be constructed with slower DRAM cells. By tending to store more frequently used instructions and data in the cache 2204 as opposed to the system memory 2203, the overall performance efficiency of the computing system improves.

System memory 2203 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 2203 prior to their being operated upon by the one or more processor(s) 2201 in the implementation of a software program. Similarly, data that a software program determines should be sent from the computing system to an outside entity through one of the computing system interfaces, or stored into an internal storage element, is often temporarily queued in system memory 2203 prior to its being transmitted or stored.

The ICH 2205 is responsible for ensuring that such data is properly passed between the system memory 2203 and its appropriate corresponding computing system interface (and internal storage device if the computing system is so designed). The MCH 2202 is responsible for managing the various contending requests for system memory 2203 access amongst the processor(s) 2201, interfaces and internal storage elements that may proximately arise in time with respect to one another.

One or more I/O devices 2208 are also implemented in a typical computing system. I/O devices generally are responsible for transferring data to and/or from the computing system (e.g., a networking adapter); or, for large scale nonvolatile storage within the computing system (e.g., hard disk drive). ICH 2205 has bi-directional point-to-point links between itself and the observed I/O devices 2208. A capture program, classification program, a database, a filestore, an analysis engine and/or a graphical user interface may be stored in a storage device or devices 2208 or in memory 2203.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Thus, a capture system and a document/content registration system have been described. In the forgoing description, various specific values were given names, such as "objects," and various specific modules, such as the "registration module" and "signature database" have been described. However, these names are merely to describe and illustrate various aspects of the present invention, and in no way limit the scope of the present invention. Furthermore, various modules, may be implemented as software or hardware modules, combined, or without dividing their functionalities into modules at all. The present invention is not limited to any modular architecture either in software or in hardware, whether described above or not.

What is claimed is:

1. An article of manufacture including program code embodied on a memory which, when executed by a machine, causes the machine to perform a method, the method comprising:
    maintaining a tiered location configuration for a capture system of a network having private internet protocol (IP) addresses, the capture system being configured for a network security application in which filtering occurs such that certain flows originated at a first computer are prohibited from reaching their originally intended destination;
    maintaining a list of private internet protocol (IP) address relationships to tier location configuration values for the capture system;
    capturing a packet with the capture system;
    classifying the packet into a plurality of tiers included within the tiered location configuration by comparing source and destination IP addresses associated with the packet to a tier mapping element maintained by the capture system, and wherein a selected first one of tiers identifies a geographic characteristic associated with the packet, and a selected second one of the tiers identifies a separate location characteristic associated with the packet, and a selected third one of the tiers identifies a division of a company, and a selected fourth one of the tiers identifies a building from which the packet originated, wherein the tiered location configuration includes separate tiers having different levels of detail; and
    receiving a search query specifying a selected one of the levels of detail associated with the tiered location configuration.

2. The article of manufacture of claim 1, further comprising:
    storing the tiered location configuration as a part of a metadata associated with the packet.

3. The article of manufacture of claim 1, further comprising:
    creating a tiered location configuration.

4. The article of manufacture of claim 1, further comprising:
    creating a list of internet protocol (IP) address relationships to tier location configuration values for the capture system.

5. The article of manufacture of claim 1, wherein the tiered location configuration comprises:
    four tiers, wherein each tier is of a different level of abstraction.

6. An article of manufacture including program code embodied on a memory which, when executed by a machine, causes the machine to perform a method, the method comprising:
    initializing a log file, the log file to store internet protocol (IP) address assignment by MAC address;
    reading the log to determine a relationship between an IP address and a user;
    maintaining a tiered location configuration for a capture system of a network having private internet protocol (IP) addresses, the capture system being configured for a network security application in which filtering occurs such that certain flows originated at a first computer are prohibited from reaching their originally intended destination;
    capturing a packet addressed to a particular IP address;
    associating the packet to a user from the log, wherein the packet is classified within the tiered location configuration by comparing source and destination IP addresses associated with the packet to a tier mapping element maintained by the capture system, and wherein a selected first one of tiers identifies a geographic characteristic associated with the packet, and a selected second one of the tiers identifies a separate location characteristic associated with the packet, and a selected third one of the tiers identifies a division of a company, and a selected fourth one of the tiers identifies a building from which the packet originated, wherein the tiered location configuration includes separate tiers having different levels of detail; and
    receiving a search query specifying a selected one of the levels of detail associated with the tiered location configuration.

7. The article of manufacture of claim 6, further comprising:
    storing an item associated with the packet in a storage system, wherein the item is associated with the user.

8. The article of manufacture of claim 7, wherein the storage system is rolling storage.

9. The article of manufacture of claim 6, wherein the log is a DHCP log.

10. A method comprising:
    maintaining a tiered location configuration for a capture system of a network having private internet protocol (IP) addresses on a memory, the capture system being configured for a network security application in which filtering occurs such that certain flows originated at a first computer are prohibited from reaching their originally intended destination;
    maintaining a list of private internet protocol (IP) address relationships to tier location configuration values for the capture system;
    capturing a packet with the capture system;
    classifying the packet into a plurality of tiers included within the tiered location configuration by comparing source and destination IP addresses associated with the packet to a tier mapping element maintained by the capture system, and wherein a selected first one of tiers identifies a geographic characteristic associated with the packet, and a selected second one of the tiers identifies a separate location characteristic associated with the packet, and a selected third one of the tiers identifies a division of a company, and a selected fourth one of the tiers identifies a building from which the packet originated, wherein the tiered location configuration includes separate tiers having different levels of detail; and
    receiving a search query specifying a selected one of the levels of detail associated with the tiered location configuration.

11. The method of claim 10, further comprising:
    storing the tiered location configuration as a part of metadata associated with the packet.

12. The method of claim 10, wherein the tiered location configuration comprises:
four tiers, wherein each tier is of a different level of abstraction.

13. A method comprising:
initializing a log file, the log file to store Internet protocol (IP) address assignment by MAC address on a memory;
reading the log to determine a relationship between an IP address and a user;
maintaining a tiered location configuration for a capture system of a network having private internet protocol (IP) addresses, the capture system being configured for a network security application in which filtering occurs such that certain flows originated at a first computer are prohibited from reaching their originally intended destination;
capturing a packet addressed to a particular IP address;
associating the packet to a user from the log, wherein the packet is classified within the tiered location configuration by comparing source and destination IP addresses associated with the packet to a tier mapping element maintained by the capture system, and wherein a selected first one of tiers identifies a geographic characteristic associated with the packet, and a selected second one of the tiers identifies a separate location characteristic associated with the packet, and a selected third one of the tiers identifies a division of a company, and a selected fourth one of the tiers identifies a building from which the packet originated, wherein the tiered location configuration includes separate tiers having different levels of detail; and
receiving a search query specifying a selected one of the levels of detail associated with the tiered location configuration.

14. The method of claim 13, further comprising:
storing an item associated with the packet in a storage system, wherein the item is associated with the user.

15. The method of claim 14, wherein the storage system is rolling storage.

* * * * *